(12) United States Patent
Yun et al.

(10) Patent No.: US 10,206,039 B1
(45) Date of Patent: Feb. 12, 2019

(54) ELECTRONIC DEVICE AND METHOD FOR RECEIVING AUDIO SIGNAL BY USING COMMUNICATION CONFIGURATION INFORMATION OF EXTERNAL ELECTRONIC DEVICE

(71) Applicant: Samsung Electronics Co., Ltd., Suwon-si, Gyeonggi-do (KR)

(72) Inventors: Yong Sang Yun, Osan-si (KR); Seung-Nyun Kim, Incheon (KR); Jae-Hyun Jo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/057,245

(22) Filed: Aug. 7, 2018

(30) Foreign Application Priority Data

Aug. 9, 2017 (KR) ........................ 10-2017-0101210

(51) Int. Cl.
*H04R 3/12* (2006.01)
*G06F 3/16* (2006.01)

(52) U.S. Cl.
CPC .............. *H04R 3/12* (2013.01); *G06F 3/162* (2013.01); *H04R 2420/07* (2013.01)

(58) Field of Classification Search
CPC ........ H04R 2420/07; H04R 3/12; G06F 3/162
USPC .......................................................... 381/77
See application file for complete search history.

(56) References Cited

U.S. PATENT DOCUMENTS

| 2012/0058727 | A1 | 3/2012 | Cook et al. |
| 2012/0230510 | A1 | 9/2012 | Dinescu et al. |
| 2017/0188152 | A1* | 6/2017 | Watson ............... H04R 5/02 |

* cited by examiner

*Primary Examiner* — Paul S Kim
(74) *Attorney, Agent, or Firm* — Jefferson IP Law, LLP

(57) ABSTRACT

An electronic device is provided. The electronic device includes an interface circuitry configured to couple with a first external electronic device through a wired communication link, a wireless communication circuitry, and a processor. The processor is configured to, in response to being coupled with the first external electronic device through the interface circuitry by the wired communication link, receive at least partial audio data that a second external electronic device has transmitted to the first external electronic device through a first wireless communication link, and in response to the wired communication link with the first external electronic device being disconnected, receive at least partial audio data that the second external electronic device has transmitted to the first external electronic device through the first wireless communication link, by using configuration information corresponding to the first wireless communication link, and output an audio signal corresponding to the at least partial audio data.

20 Claims, 13 Drawing Sheets

ELECTRONIC DEVICE AND METHOD FOR
RECEIVING AUDIO SIGNAL BY USING
COMMUNICATION CONFIGURATION
INFORMATION OF EXTERNAL
ELECTRONIC DEVICE

CROSS-REFERENCE TO RELATED
APPLICATION(S)

This application is based on and claims priority under 35 U.S.C. § 119 of a Korean patent application number 10-2017-0101210, filed on Aug. 9, 2017, in the Korean Intellectual Property Office, the disclosure of which is incorporated by reference herein in its entirety.

BACKGROUND

1. Field

The disclosure relates to a method and apparatus for outputting, through an electronic device, an audio that is reproduced in an external electronic device.

2. Description of Related Art

With the growth of digital technologies, various electronic devices such as an earphone, an ear bud, a wireless speaker, a wireless headset, etc. are being supplied to output audio data reproduced in an audio source device such as a mobile communication terminal, a personal digital assistant (PDA), an electronic organizer, a smart phone, a tablet personal computer (PC), a wearable device or the like. These electronic devices can receive the audio data reproduced in the audio source device, through a wireless communication link with the audio source device.

To output stereo audio data received from the audio source device, this electronic device can include a master device outputting the one side (e.g., left) audio data and a slave device outputting the other side (e.g., right) audio data.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

The master device can receive audio data from the audio source device, and transmit the received audio data to the slave device through a wireless communication link with the slave device. The master device can perform more operations than the slave device. In this process, the battery consumption of the master device can be large.

Another aspect of the disclosure is to provide an electronic device and method for decreasing the battery consumption of a master device or a slave device by using a wired communication link between the master device and the slave device.

Another aspect of the disclosure is to provide an electronic device and method for, in response to a wired communication link between a master device and a slave device being interrupted, sniffing audio data by the slave device, thereby minimizing an operation of the master device.

Additional aspects will be set forth in part in the description which follows and, in part, will be apparent from the description, or may be learned by practice of the presented embodiments.

Technological solutions the disclosure seeks to achieve are not limited to the above-mentioned technological solutions, and other technological solutions not mentioned above would be able to be clearly understood by a person having ordinary skill in the art from the following statement.

In accordance with an aspect of the disclosure, an electronic device is provided. The electronic device includes an interface circuitry configured to couple with a first external electronic device through a wired communication link, a wireless communication circuitry, and a processor configured to, in response to being coupled with the first external electronic device through the interface circuitry by the wired communication link, receive, from the first external electronic device through the interface circuitry, at least partial audio data among audio data that a second external electronic device has transmitted to the first external electronic device through a first wireless communication link with the first external electronic device, and in response to the wired communication link with the first external electronic device being disconnected, receive, from the second external electronic device through the wireless communication circuitry, at least partial audio data among the audio data that the second external electronic device has transmitted to the first external electronic device through the first wireless communication link, by using configuration information corresponding to the first wireless communication link, and output an audio signal corresponding to the at least partial audio data.

In accordance with an aspect of the disclosure, a method of an electronic device is provided. The method includes, in response to being coupled with a first external electronic device by a wired communication link, receiving, from the first external electronic device through an interface circuitry of the electronic device, at least partial audio data among audio data that a second external electronic device has transmitted to the first external electronic device through a first wireless communication link with the first external electronic device, and in response to the wired communication link with the first external electronic device being disconnected, receiving, from the second external electronic device through a wireless communication circuitry of the electronic device, at least partial audio data among the audio data that the second external electronic device has transmitted to the first external electronic device through the first wireless communication link, by using configuration information corresponding to the first wireless communication link, and outputting an audio signal corresponding to the at least partial audio data.

In accordance with an aspect of the disclosure, an electronic device is provided. The electronic device includes an interface circuitry configured to couple with a first external electronic device through a wired communication link, and a wireless communication circuitry, and a processor configured to, in response to being coupled with the first external electronic device through the interface circuitry by the wired communication link, transmit, to the first external electronic device through the interface circuitry, at least partial audio data among audio data that is received from a second external electronic device through a first wireless communication link, and transmit configuration information related with the first wireless communication link to the first external electronic device, wherein, in response to the wired communication link being disconnected, the first external electronic device acquires the at least partial audio data from the second external electronic device by using the configuration information, and output an audio signal corresponding to another at least partial audio data among the received audio data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
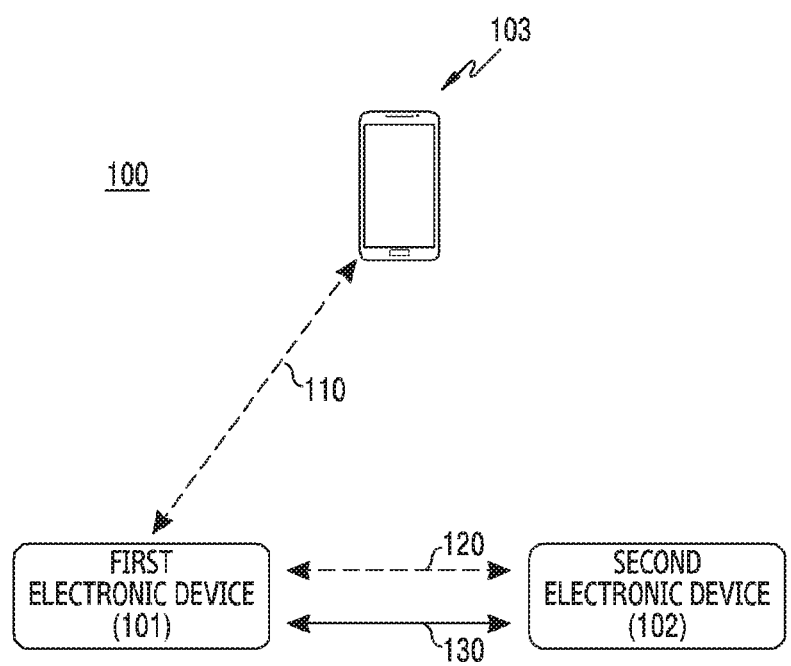
FIG. 1 illustrates an example of an environment including a first electronic device, a second electronic device, and an audio source device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression of a singular form may include the expression of a plural form unless otherwise dictating clearly in context. In the disclosure, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The term "module" used in the disclosure may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. For example, the "module" may configured as an application-specific integrated circuit (ASIC).

Various embodiments of the disclosure may be implemented by software (e.g., program) that includes an instruction stored in a machine (e.g., computer)—readable storage media (e.g., an internal memory or external memory). A machine, which is a device calling a stored instruction from the storage media and being operable according to the called instruction, may include an electronic device according to disclosed embodiments. In response to the instruction being executed by a processor, the processor may perform a function corresponding to the instruction itself or by using other constituent elements under the control of the processor. The instruction may include a code that is provided or executed by a compiler or interpreter. The machine-readable storage media may be provided in the form of a non-transitory storage media. Here, 'non-transitory' merely means that the storage media does not include a signal and is tangible, and does not distinguish that data is stored semi-permanently or temporarily in the storage media.

According to an embodiment, a method according to various embodiments of the disclosure may be included and provided in a computer program product. The computer program product may be traded as a product between a seller and a buyer. The computer program product may be distributed on-line in the form of a machine-readable storage media (e.g., compact disc read only memory (CD-ROM)) or through an application store (e.g., PlayStore™). In online distribution, at least a part of the computer program product may be at least transitorily stored or be temporarily provided in a storage media such as a memory of a manufacturer's server, an application store's server or a relay server.

Each of constituent elements (e.g., modules or programs) according to various embodiments may consist of a single or plurality of entities and, among the aforementioned corresponding sub constituent elements, some sub constituent elements may be omitted, or other sub constituent elements may be further included in various embodiments. Alternatively or additionally, some constituent elements (e.g., modules or programs) may be integrated into one entity, to identically or similarly perform each of functions carried out by the original constituent elements before integration. Operations carried out by the module, the program module or other constituent element according to various embodiments may be executed in a sequential, parallel, repeated or heuristic manner, or at least some operations may be executed in different order or be omitted, or another operation may be added.

FIG. 1 illustrates an example of an environment including a first electronic device, a second electronic device, and an audio source device according to an embodiment of the disclosure.

Referring to FIG. 1, the environment 100 may include the first electronic device 101, the second electronic device 102, and the audio source device 103.

The audio source device 103 may include a mobile phone, a smart phone, a tablet PC, a music player, a Moving Picture Experts Group phase 1 or phase 2 (MPEG-1 or MPEG-2) audio layer 3 (MP3) player, a media player, a home theater, a wearable device, a laptop computer, a desktop personal computer (PC), a server, a personal digital assistant (PDA), a portable multimedia player (PMP), etc. The first electronic device 101 and the second electronic device 102 may be audio devices including an earphone, an ear bud, a wireless speaker, a wireless headset, etc. For example, the first electronic device 101 may be the one side (e.g., left) ear bud among a pair of ear buds, and the second electronic device 102 may be the other side (e.g., right) ear bud.

In various embodiments, the first electronic device 101 and the second electronic device 102 may be wirelessly or wiredly coupled with each other. For example, the first electronic device 101 and the second electronic device 102 may form (e.g., Bluetooth (BT) pairing) a second wireless communication link 120. The first electronic device 101 and the second electronic device 102 may form a wired communication link 130 as well.

The audio source device 103 may reproduce audio data on an audio source. The audio source device 103 may reproduce audio data stored in the audio source device 103 as well, and may receive audio data from an external electronic device (e.g., server), to reproduce the audio data in a streaming method as well. The audio source device 103 may not only output the reproduced audio data through the audio source device 103, but also may output the audio data through the first electronic device 101 or the second electronic device 102. The audio data may be outputted as an audio signal (or sound signal) corresponding to the audio data.

To output the audio data through the first electronic device 101 or the second electronic device 102, the audio source device 103 may be wirelessly coupled with the first electronic device 101 or the second electronic device 102. For example, the audio source device 103 may form (e.g., BT pairing) a first wireless communication link 110 with the first electronic device 101. The audio source device 103 may transmit the audio data reproduced in the audio source device 103, to the first electronic device 101 through the first wireless communication link 110. For another example, the audio source device 103 may form a wireless communication link (not shown) with the second electronic device 102 in place of the first electronic device 101, and transmit the audio data to the second electronic device 102 through the formed wireless communication link as well.

The first electronic device 101 (or the second electronic device 102) may receive audio data from the audio source device 103, to output an audio signal (or sound signal) corresponding to the audio data. For example, to receive the audio data from the audio source device 103, the first electronic device 101 may form (e.g., BT pairing) the first wireless communication link 110 with the audio source device 103. The first electronic device 101 may receive the audio data from the audio source device 103 through the first wireless communication link 110. The first electronic device 101 may output the received audio data, as an audio signal corresponding to the audio data.

In response to the first electronic device 101 forming the wired communication link 130 with the second electronic device 102, the first electronic device 101 may transmit at least a part of audio data received from the audio source device 103, to the second electronic device 102 through the wired communication link 130. In response to the first electronic device 101 forming the second wireless communication link 120 with the second electronic device 102, the first electronic device 101 may not transmit the audio data to the second electronic device 102.

The aforementioned operations of the first electronic device 101 may be denoted as a master operation. The master operation may include an operation of establishing a wireless communication link (e.g., the first wireless communication link 110) with the audio source device 103, and an operation of receiving audio data from the audio source device 103 through the wireless communication link, and, in response to a wired communication link (e.g., the wired communication link 130) being established with another electronic device (e.g., the second electronic device 102), transmitting at least a part of the audio data to another electronic device through the wired communication link. Also, the master operation may include an operation of acquiring information (or configuration information and hereinafter, referred to as a communication parameter) on the wireless communication link (e.g., the first wireless communication link 110) formed between the first electronic device 101 and the audio source device 103, and an operation of transmitting the communication parameter to another electronic device (e.g., the second electronic device 102).

The communication parameter may be information for establishing the first wireless communication link 110 between the first electronic device 101 and the audio source device 103. The communication parameter may be used for accessing (or observing) the first wireless communication link 110 by another electronic device (e.g., the second electronic device 102). The communication parameter may be used for, by accessing (or observing) the first wireless communication link 110 by another electronic device (e.g., the second electronic device 102), acquiring information transmitted and/or received through the first wireless communication link 110. The communication parameter may be used for sniffing, by another electronic device (e.g., the second electronic device 102), information (e.g., the audio data transmitted from the audio source device 103 to the first electronic device 101) transmitted and/or received through the first wireless communication link 110. For example, in response to the first wireless communication link 110 being formed according to a Bluetooth protocol, the communication parameter may include Bluetooth device address (BD_ADDR), logical transport address (LT_ADDR), a native clock (CLKN) of a source (SRC) (e.g., the audio source device 103), a clock offset between the SRC and a sink (SNK) (e.g., the first electronic device 101), and/or an encryption parameter (e.g., key exchange) on a link between the SRC and the SNK.

In response to the first electronic device 101 receiving audio data from the audio source device 103 through the first wireless communication link 110 formed with the audio source device 103 (i.e., in response to performing a master operation), the second electronic device 102 may perform the following operations (i.e., slave operation).

In some embodiments, in response to the second electronic device 102 forming the wired communication link 130 with the first electronic device 101, the second electronic device 102 may receive at least a part of audio data that the first electronic device 101 has received from the audio source device 103, from the first electronic device 101 through the wired communication link 130. The second electronic device 102 may output the received at least partial audio data, as an audio signal.

In other some embodiments, in response to the second electronic device 102 forming the second wireless communication link 120 with the first electronic device 101, the second electronic device 102 may not receive audio data from the first electronic device 101. The second electronic device 102 may acquire audio data that the first electronic device 101 receives from the audio source device 103, from the first wireless communication link 110 by using the communication parameter. The operation of acquiring, by the second electronic device 102, the audio data from the first wireless communication link 110 by using the communication parameter may include sniffing (or snooping). The sniffing or snooping may represent an operation in which, by using the communication parameter that is information on the wireless communication link (e.g., the first wireless communication link 110) between other electronic devices, an electronic device (e.g., the second electronic device 102) accesses a wireless communication link (e.g., the first wireless communication link 110), to acquire information transmitted and/or received through the wireless communication link (e.g., the first wireless communication link 110). The second electronic device 102 may output at least a part of the acquired (or sniffed) audio data, as an audio signal. Meantime, the second wireless communication link 120 formed between the second electronic device 102 and the first electronic device 101 may be used for receiving, by the second electronic device 102, information for acquisition (or sniffing) or supplementary information on audio data.

In some embodiments, the first wireless communication link 110 or the second wireless communication link 120 may be formed according to at least a part of a Bluetooth protocol. In other some embodiments, the first wireless communication link 110 or the second wireless communication link 120 may be formed according to a non-standard Bluetooth protocol or non-Bluetooth protocol. For example, other protocols different from the Bluetooth protocol may be used such as Wi-Fi (e.g., IEEE 802.11) and/or peer to peer (P2P) (e.g., ad-hoc, Wi-Fi direct, direct link setup (DLS), etc.) schemes, etc.

Figure 2A:
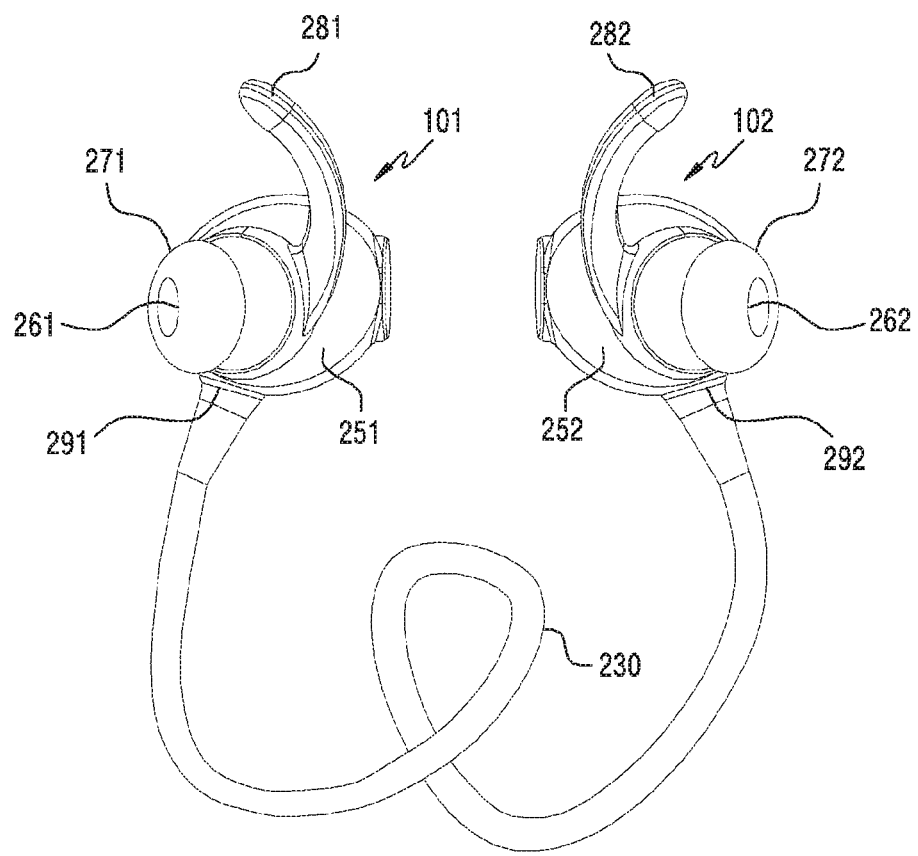
FIG. 2A illustrates an example of wired coupling of a first electronic device and a second electronic device according to an embodiment of the disclosure.

FIG. 2A illustrates an example of wired coupling of a first electronic device and a second electronic device according to an embodiment of the disclosure.

Referring to FIG. 2A, the first electronic device 101 and the second electronic device 102 may be wiredly coupled with each other through a cable 230. The first electronic device 101 and the second electronic device 102 may form the wired communication link 130 through the cable 230. However, the form of the first electronic device 101, the second electronic device 102, and the cable 230 is not limited to this, and may be various forms.

The first electronic device 101 may include a housing 251, a hole 261, an ear tip 271, a fixing unit 281, and/or a connector hole 291.

The first electronic device 101 may include the housing 251 which surrounds at least a part of internal constituent elements (e.g., a processor, an audio module, a speaker, a power management module, a battery, an interface, a wireless communication module, an input device, a memory or the like) of the first electronic device 101. The hole 261 may be located in a partial region of the housing 251. Through the hole 261, a sound signal outputted through the speaker of the first electronic device 101 may flow out. The ear tip 271 may be mounted around the hole 261. For example, the ear tip 271 may surround the hole 261. Meantime, the fixing unit 281 may be added to the housing 251 wherein a user of the first electronic device 101 may easily wear the first electronic device 101. The ear tip 271 or the fixing unit 281 may be formed of elastic materials.

The housing 251 may include the connector hole 291 (or an interface hole). Through the connector hole 291, the cable 230 may be connected (or mounted) to the first electronic device 101. Through the connector hole 291, an interface of the cable 230 may be connected to an interface of the first electronic device 101. By using the cable 230, the first electronic device 101 may be wiredly coupled with the second electronic device 102. The one side end of the cable 230 may be mounted on the connector hole 291 of the first electronic device 101, and the other side end of the cable 230 may be mounted on a connector hole 292 of the second electronic device 102. By coupling the interface of the first electronic device 101 and an interface of the second electronic device 102, the cable 230 may form the wired communication link 130.

The cable 230 may further include a battery (not shown) and a power management circuitry (not shown). The battery of the cable 230 may be charged in a wireless or wired charging scheme by using the power management circuitry. The cable 230 may be connected to the interface of the first electronic device 101 through the connector hole 291, whereby the first electronic device 101 may be charged. For example, terminals (or pins) (e.g., V_, GND, etc.) coupled to a power source of the battery of the cable 230 may be coupled with the interface of the first electronic device 101, whereby the first electronic device 101 may be charged. In response to the cable 230 being connected to the second electronic device 102 through the connector hole 292, whereby the second electronic device 102 may be charged.

A housing 252, a hole 262, an ear tip 272, a fixing unit 282, and/or the connector hole 292 (or an interface hole)

which are constituent elements of the second electronic device 102 may perform roles corresponding to the constituent elements of the first electronic device 101. The second electronic device 102 may have the same construction as the first electronic device 101, or further include an additional construction.

Figure 2B:
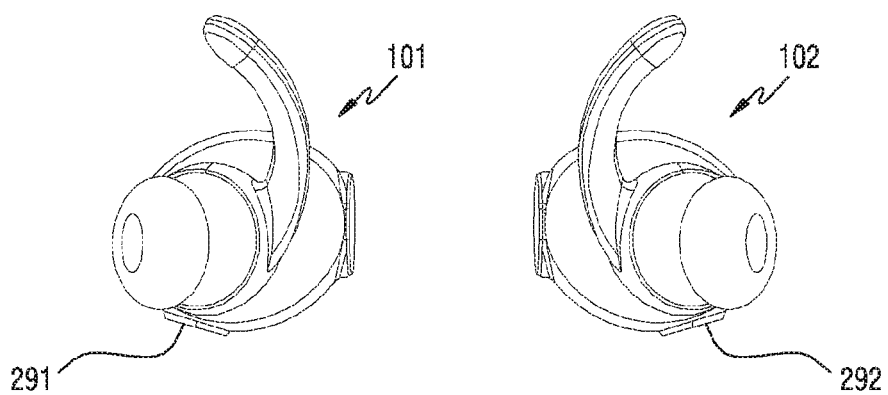
FIG. 2B illustrates an example of wireless coupling of a first electronic device and a second electronic device according to an embodiment of the disclosure.

FIG. 2B illustrates an example of wireless coupling of a first electronic device and a second electronic device according to an embodiment of the disclosure.

Referring to FIG. 2B, in response to removing the cable 230, the first electronic device 101 and the second electronic device 102 may be decoupled from each other.

In response to the first electronic device 101 and the second electronic device 102 being decoupled from each other, the second wireless communication link 120 may be established between the first electronic device 101 and the second electronic device 102. For example, the first electronic device 101 and the second electronic device 102 may each include a wireless communication module, and may establish the second wireless communication link 120 through the wireless communication modules of the first electronic device 101 and the second electronic device 102. For example, the second wireless communication link 120 may be established, in response to disconnecting the cable 230 from the connector hole 291 of the first electronic device 101 and/or disconnecting the cable 230 from the connector hole 292 of the second electronic device 102.

In some embodiments, in response to the first electronic device 101 and the second electronic device 102 being wiredly coupled with each other through the cable 230 as illustrated in FIG. 2A, the first electronic device 101 may transmit the communication parameter to the second electronic device 102 through the wired communication link 130. In other some embodiments, in response to the first electronic device 101 and the second electronic device 102 being wirelessly coupled with each other as illustrated in FIG. 2B, the first electronic device 101 may transmit the communication parameter to the second electronic device 102 through the second wireless communication link 120.

Figure 3:
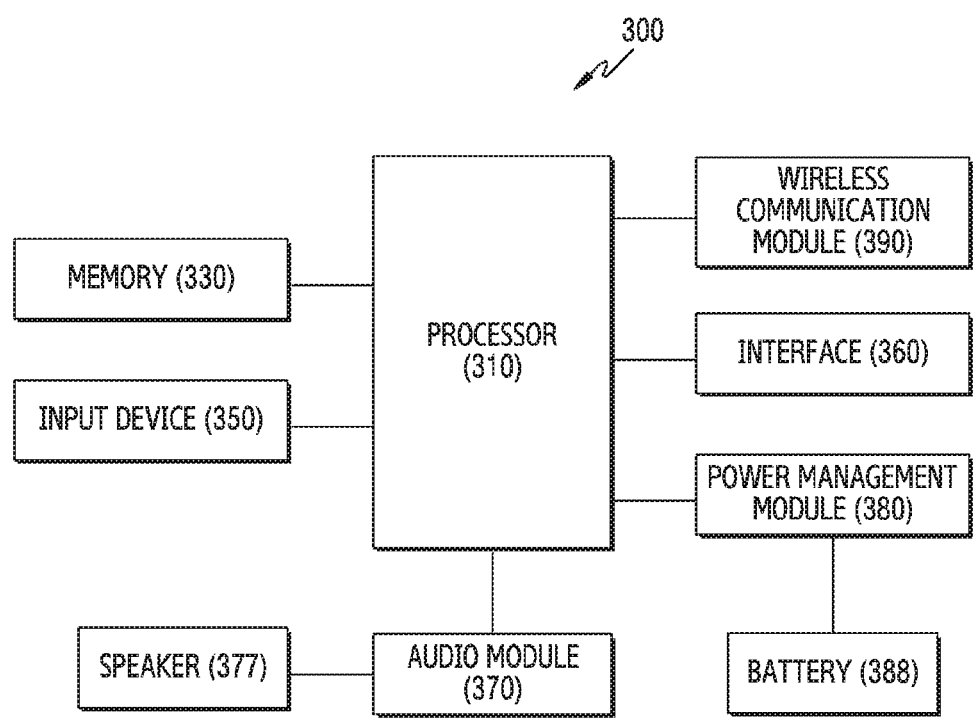
FIG. 3 illustrates an example of a functional construction of an electronic device according to an embodiment of the disclosure.

FIG. 3 illustrates an example of a functional construction of an electronic device according to an embodiment of the disclosure. The electronic device 300 may include the first electronic device 101 (e.g., left (or right) ear bud) or the second electronic device 102 (e.g., right (or left) ear bud).

Referring to FIG. 3, the electronic device 300 may include a processor 310, a wireless communication module 390, an interface 360, an audio module 370, a speaker 377, an input device 350, a power management module 380, a battery 388, and/or a memory 330.

The processor 310 may control a general operation of the electronic device 300. The processor 310 may receive commands of other constituent elements (e.g., the wireless communication module 390, the input device 350, the audio module 370, the power management module 380, the memory 330, or the interface 360), and may interpret the received commands, and may perform computation or process data according to the interpreted commands. The processor 310 may be implemented as software as well, and may be implemented as hardware such as a chip, a circuitry, etc. as well, and may be implemented as a set of software and hardware as well. The processor 310 may be one in number as well, or may be a set of a plurality of processors as well.

The processor 310 may control the wireless communication module 390 to establish (e.g., BT pairing), by the electronic device 300 (e.g., the first electronic device 101), the first wireless communication link 110 with the audio source device 103. The first wireless communication link 110 may be a link in which two-way communication is possible. For example, the processor 310 may receive audio data from the audio source device 103, and transmit, to the audio source device 103, a response (e.g., acknowledgement (ACK) or negative acknowledgement (NACK)) representing whether it has successfully received the audio data.

In response to identifying (or detecting) that the electronic device 300 (e.g., the first electronic device 101) establishes the first wireless communication link 110 with the audio source device 103, the processor 310 may obtain audio data received from the audio source device 103 through the first wireless communication link 110, by using the wireless communication module 390. For example, in response to audio data on an audio source being reproduced in the audio source device 103, the audio data may be received to the electronic device 300 (e.g., the first electronic device 101) through the first wireless communication link 110. The received audio data may be the form of a digital audio signal. The processor 310 may control the audio module 370 to convert (e.g., decode) the received digital audio signal into an analog audio signal. The processor 310 may control the audio module 370 to output at least a part of the converted analog audio signal through the speaker 377. For example, the received audio data may be stereo data including data on a left (L) channel and data on a right (R) channel. The processor 310 may control the audio module 370 to output an audio signal on one channel (e.g., left) or all both channels (e.g., left and right) among the converted analog audio signal, through the speaker 377 of the electronic device 300, according to configuration information of the electronic device 300.

The processor 310 may identify whether the electronic device 300 (e.g., the first electronic device 101) is wiredly coupled with another electronic device (e.g., the second electronic device 102) by using the interface 360. In response to identifying that the electronic device 300 (e.g., the first electronic device 101) is coupled with another electronic device (e.g., the second electronic device 102) through the interface 360 by the wired communication link 130, the processor 310 may transmit at least a part of audio data received from the audio source device 103, to another electronic device (e.g., the second electronic device 102) through the wired communication link 130. The processor 310 may transmit audio data on one channel (e.g., left) or audio data on all both channels (e.g., left and right) among the audio data, to another electronic device (e.g., the second electronic device 102) through the wired communication link 130 formed through the interface 360. The processor 310 may transmit audio data before or after conversion (i.e., decoding), to another electronic device (e.g., the second electronic device 102) through the wired communication link 130 formed through the interface 360.

In response to identifying the establishment of the first wireless communication link 110 between the electronic device 300 (e.g., the first electronic device 101) and the audio source device 103, the processor 310 may acquire (or identify) a communication parameter that is information on the first wireless communication link 110. The processor 310 may control the memory 330 to store the acquired communication parameter. The processor 310 may transmit the communication parameter to another electronic device (e.g., the second electronic device 102) through various paths (e.g., the wired communication link 130 or the second wireless communication link 120).

The processor 310 may transmit a mode parameter as well as the communication parameter, to another electronic device (e.g., the second electronic device 102) through various paths. The mode parameter may include information on a sound effect or audio filter which is applied to audio data in response to the electronic device 300 outputting the received audio data through the speaker 377. The mode parameter may include information (e.g., volume configuration information and/or output loudness) on an output intensity or strength which is applied in response to the electronic device 300 outputting the received audio data. The mode parameter may include information on setting of an application that is executed to reproduce music in the audio source device 103. The mode parameter may include information on a left (L) channel of audio data and information on a right (R) channel of the audio data. The mode parameter may be used to output, by the first electronic device 101 and the second electronic device 102, audio data to which the same or similar effect (or processing) has been applied. The mode parameter may be used to output, by the first electronic device 101 and the second electronic device 102, the audio data to which the same or similar effect (or processing) has been applied, even in response to the wired communication link 130 between the first electronic device 101 and the second electronic device 102 being disconnected. The mode parameter may be used to output, by the electronic device 300, the audio data to which the same or similar effect (or processing) has been applied, in response to the wired communication link 130 being established and in response to being interrupted. For example, the mode parameter may be previously stored in the memory 330 of the electronic device 300 (e.g., the first electronic device 101). For another example, the mode parameter may be received to the electronic device 300 (e.g., the first electronic device 101) through the first wireless communication link 110 from the audio source device 103. The processor 310 may control the memory 330 to store the received mode parameter.

The processor 310 may transmit the communication parameter to another electronic device (e.g., the second electronic device 102), and may additionally transmit even the mode parameter to another electronic device (e.g., the second electronic device 102). The communication parameter and the mode parameter may be simultaneously transmitted as one packet from the first electronic device 101 to the second electronic device 102 as well, and may be generally simultaneously transmitted as well, and may be mutually independently transmitted as well. The communication parameter or the mode parameter may be transmitted periodically (or cyclically) or non-periodically (non-cyclically).

In some embodiments, the processor 310 may transmit the communication parameter (or additionally the mode parameter) to another electronic device (e.g., the second electronic device 102) through the wired communication link 130 by using the interface 360. For example, in response to identifying that the electronic device 300 (e.g., the first electronic device 101) is coupled with another electronic device (e.g., the second electronic device 102) through the wired communication link 130, in response to identifying that the first wireless communication link 110 is established, the processor 310 may transmit the communication parameter or the mode parameter to another electronic device (e.g., the second electronic device 102) through the wired communication link 130. For another example, in response to identifying that the electronic device 300 (e.g., the first electronic device 101) is coupled with another electronic device (e.g., the second electronic device 102) through the wired communication link 130, the processor 310 may periodically or non-periodically transmit the communication parameter or the mode parameter to another electronic device (e.g., the second electronic device 102) through the wired communication link 130. The communication parameter may further include information for establishing the second wireless communication link 120 (e.g., BT pairing) between the electronic device 300 (e.g., the first electronic device 101) and another electronic device (e.g., the second electronic device 102). For example, the communication parameter may further include identification information (ID) and address information of the electronic device 300 (e.g., the first electronic device 101).

In other some embodiments, by using the wireless communication module 390, the processor 310 may transmit the communication parameter (or additionally the mode parameter) to another electronic device (e.g., the second electronic device 102) through the second wireless communication link 120. For example, in response to identifying that the wired communication link 130 is disconnected, the processor 310 may establish the second wireless communication link 120 with another electronic device (e.g., the second electronic device 102) by using the wireless communication module 390. In response to identifying that the second wireless communication link 120 is established, the processor 310 may transmit the communication parameter or the mode parameter to another electronic device (e.g., the second electronic device 102) through the second wireless communication link 120.

The processor 310 may identify whether the wired communication link 130 formed with another electronic device (e.g., the second electronic device 102) through the interface 360 is interrupted. The interruption of the wired communication link 130 may mean that the cable 230 is disconnected. In response to identifying that the wired communication link 130 with another electronic device (e.g., the second electronic device 102) is interrupted, the processor 310 may control the wireless communication module 390 to establish (e.g., BT pairing) the second wireless communication link 120 with another electronic device (e.g., the second electronic device 102). In some embodiments, in response to identifying that the second wireless communication link 120 is established (e.g., BT pairing), the processor 310 may transmit the communication parameter to another electronic device (e.g., the second electronic device 102) through the second wireless communication link 120, and may additionally transmit the mode parameter as well.

If the electronic device 300 is the second electronic device 102 performing a slave operation, the processor 310 may perform the following operations as well.

In response to the wired communication link 130 with another electronic device (e.g., the first electronic device 101) being established, the processor 310 may receive audio data from another electronic device (e.g., the first electronic device 101) through the wired communication link 130 by using the interface 360. The received audio data may be at least a part (e.g., data on a right channel) of audio data that another electronic device (e.g., the first electronic device 101) has received from the audio source device 103.

The processor 310 may control the audio module 370 to output audio data received through the wired communication link 130. For example, the processor 310 may receive, through the interface 360, an analog audio signal that is converted (i.e., decoded) through an audio module of another electronic device (e.g., the first electronic device 101), and output the received analog audio signal through the speaker 377. For another example, the processor 310 may control the audio module 370 to receive a digital audio signal not converted (i.e., decoded), from another electronic device (e.g., the first electronic device 101) through the interface 360, and convert (i.e., decode) the received digital audio signal into an analog audio signal. The processor 310 may output the converted analog audio signal through the speaker 377.

The processor 310 may receive the communication parameter from another electronic device (e.g., the first electronic device 101), and may additionally receive the mode parameter. Or, at least a part of the mode parameter may be previously stored in the memory 330 as well. In some embodiments, the processor 310 may receive the communication parameter (or additionally the mode parameter) from another electronic device (e.g., the first electronic device 101) through the wired communication link 130. For example, the processor 310 may establish the second wireless communication link 120 with another electronic device (e.g., the first electronic device 101), based at least on identifying that the wired communication link 130 is disconnected, by using ID and address information of another electronic device (e.g., the first electronic device 101) included in the received communication parameter.

In other some embodiments, in response to identifying that the wired communication link 130 is disconnected, the processor 310 may control the wireless communication module 390 to establish the second wireless communication link 120 with another electronic device (e.g., the first electronic device 101). In response to identifying that the second wireless communication link 120 is established, the processor 310 may receive the communication parameter (or additionally the mode parameter) from another electronic device (e.g., the first electronic device 101) through the second wireless communication link 120. The processor 310 may control the memory 330 to store the communication parameter or mode parameter received from another electronic device (e.g., the first electronic device 101).

In response to identifying that the wired communication link 130 is disconnected, the processor 310 may control the wireless communication module 390 to receive audio data that the audio source device 103 transmits to another electronic device (e.g., the first electronic device 101), by using the communication parameter. The processor 310 may control the wireless communication module 390 to receive or acquire audio data from the audio source device 103 or the first wireless communication link 110, by using the communication parameter. For example, the processor 310 may control the wireless communication module 390 to access (or observe) the first wireless communication link 110 by using the communication parameter. The processor 310 may control the wireless communication module 390 to acquire audio data that the audio source device 103 transmits to another electronic device (e.g., the first electronic device 101), from the first wireless communication link 110, by using the communication parameter. For example, the operation of receiving (or acquiring) the audio data from the audio source device 103 (or the first wireless communication link 110) through the wireless communication module 390 by using the communication parameter may include sniffing.

The processor 310 may control the audio module 370 to output audio data received from the audio source device 103 or acquired from the first wireless communication link 110. For example, the processor 310 may control the audio module 370 to convert (e.g., decode) the received audio data into an analog audio signal. The processor 310 may control the audio module 370 to output one channel (e.g., right) or all both channels (e.g., left and right) among the converted audio signal through the speaker 377, according to configuration information of the electronic device 300 (e.g., the second electronic device 102). The electronic device 300 (e.g., the second electronic device 102) may output the acquired audio data generally at the same time as another electronic device (e.g., the first electronic device 101) outputs audio data. The processor 310 may apply the same sound effect as another electronic device (e.g., the first electronic device 101) to the acquired audio data by using the mode parameter, to output the resultant audio data.

The processor 310 may control the wireless communication module 390 to transmit a response (e.g., ACK or NACK) representing whether it has successfully received audio data, to another electronic device (e.g., the first electronic device 101) through the second wireless communication link 120.

The wireless communication module 390 may establish a wireless communication link between the electronic device 300 and external electronic devices (e.g., the audio source device 103, the first electronic device 101 or the second electronic device 102), and may perform communication through the established communication link.

For example, in response to the electronic device 300 being the first electronic device 101, the wireless communication module 390 may establish the first wireless communication link 110 with the audio source device 103, and may establish the second wireless communication link 120 with the second electronic device 102. The wireless communication module 390 may receive audio data from the audio source device 103 through the first wireless communication link 110, and may transmit a response (e.g., ACK or NACK) representing whether it has normally received the audio data, to the audio source device 103. The wireless communication module 390 may transmit the communication parameter or mode parameter to the second electronic device 102 through the second wireless communication link 120, and may receive a response (e.g., ACK or NACK) representing whether the second electronic device 102 has normally received audio data, from the second electronic device 102.

For another example, in response to the electronic device 300 being the second electronic device 102, the wireless communication module 390 may establish the second wireless communication link 120 with the first electronic device 101. The wireless communication module 390 may receive the communication parameter or mode parameter from the first electronic device 101 through the second wireless communication link 120, and may transmit a response (e.g., ACK or NACK) representing whether it has normally received audio data, to the first electronic device 101. The wireless communication module 390 may access the first wireless communication link 110 by using the communication parameter, thereby receiving (or acquiring) audio data that the audio source device 103 transmits to the first electronic device 101 through the first wireless communication link 110.

The interface 360 may support a designated protocol capable of wiredly coupling with an external electronic device (e.g., the first electronic device 101 or the second electronic device 102). The interface 360 may be wiredly coupled with an interface of another electronic device through the cable 230. For example, the interface of the first electronic device 101 may be coupled with the interface of the second electronic device 102 through the cable 230, thereby forming the wired communication link 130 (e.g., serial communication) with the second electronic device 102. In some embodiments, in response to the wired communication link 130 being established between the first electronic device 101 and the second electronic device 102, the interface of the first electronic device 101 may be used to transmit audio data, and the interface of the second electronic device 102 may be used to receive the audio data.

The audio module 370 may process a signal related to a sound. The audio module 370 may acquire a sound signal (e.g., a user's voice signal) through the input device 350 (e.g., a microphone). By using an electro-acoustic transducer, the audio module 370 may convert the acquired sound signal into an analog audio signal (or electrical signal) corresponding to the sound signal. The audio module 370 may convert the analog audio signal into a digital audio signal through a converter (e.g., an analog-to-digital converter (ADC)). By using a codec, the audio module 370 may encode or compress the analog audio signal into a digital audio signal. The audio module 370 may transmit the digital audio signal to other constituent elements (e.g., the processor 310, the wireless communication module 390, the interface 360, the memory 330, etc.) of the electronic device 300.

The audio module 370 may receive a digital audio signal from the other constituent elements (e.g., the processor 310, the wireless communication module 390, the interface 360, the memory 330, etc.) of the electronic device 300. The audio module 370 may convert the digital audio signal into an analog audio signal through a converter (e.g., a digital-to-analog converter (DAC)). For example, by using a codec, the audio module 370 may decode or decompress the digital audio signal into the analog audio signal. By using an electro-acoustic transducer, the audio module 370 may convert the analog audio signal (or electrical signal) into a sound signal corresponding to the analog audio signal. The audio module 370 may output a sound signal through an output device (e.g., speaker 377). The audio module 370 may output a bone conduction signal through the output device as well.

The audio module 370 may be implemented as a set of software (e.g., a codec) and hardware (e.g., a codec, an ADC, a DAC, an electro-acoustic transducer, etc.). For example, the codec may be the form of software as well, and may be the form of hardware as well. At least a part (e.g., codec) of the audio module 370 may be included in the processor 310.

In various embodiments, in response to the electronic device 300 being the first electronic device 101, the audio module 370 may decode audio data received from the audio source device 103 through the first wireless communication link 110, to output the decoded audio data through the speaker 377. For example, the audio module 370 may output, through the speaker 377, audio data on one channel (e.g., left channel) among the received audio data, according to configuration information of the first electronic device 101. In response to the electronic device 300 (e.g., the first electronic device 101) being coupled with another electronic device (e.g., the second electronic device 102) through the wired communication link 130, the audio module 370 may transmit, through the interface 360, at least a part of audio data which is received from the audio source device 103 through the first wireless communication link 110. For example, the audio module 370 may transmit audio data on one channel among the received audio data, to another electronic device (e.g., the second electronic device 1020 through the interface 360. For another example, the audio module 370 may transmit data on all both channels (e.g., left and right channels) among the received audio data, to another electronic device (e.g., the second electronic device 102) through the interface 360. The audio data transmitted to another electronic device (e.g., the second electronic device 102) may be audio data decoded in the electronic device 300 (e.g., the first electronic device 101) as well, and may be the original audio data before decoding as well.

In various embodiments, in response to the electronic device 300 being the second electronic device 102, the audio module 370 may output, through the speaker 377, audio data received from another electronic device (e.g., the first electronic device 101) through the wired communication link 110. For example, in response to audio data decoded in another electronic device (e.g., the first electronic device 101) being received through the interface 360, the audio module 370 may receive the audio data from the interface 360, to output the received audio data through the speaker 377. For another example, in response to audio data before being decoded in another electronic device (e.g., the first electronic device 101) being received through the interface 360, the audio data may be decoded in the electronic device 300 (e.g., the second electronic device 102). The audio module 370 may decode the audio data and thereafter, output the decoded audio data through the speaker 377. In response to receiving audio data on one channel (e.g., right channel) from another electronic device (e.g., the first electronic device 101), the audio module 370 may output the audio data on the one channel (e.g., right channel). In response to receiving audio data on all both channels (e.g., left and right channels) from another electronic device (e.g., the first electronic device 101), the audio module 370 may output the audio data on the one channel (e.g., right channel) or the audio data on the all both channels, according to configuration information of the electronic device 300 (e.g., the second electronic device 102).

Before outputting audio data, the audio module 370 of the electronic device 300 (e.g., the first electronic device 101 and the second electronic device 102) may perform various processing for the audio data, based at least on a previously stored mode parameter. For example, the audio module 370 may perform sampling rate change for one or more digital audio signals, applying of one or more filters, interpolation processing, amplification or attenuation (e.g., amplification or attenuation of a partial frequency band or whole frequency band) processing, noise processing (e.g., noise or echo attenuation), channel change (e.g., conversion between mono and stereo), mixing, or designated signal extraction. For example, by using the mode parameter, the first electronic device 101 and the second electronic device 102 may output audio data to which the same sound effect or audio filter is applied.

In various embodiments, in response to the electronic device 300 being the second electronic device 102, the audio module 370 may perform processing for audio data output identically in response to the wired communication link 130 being established and in response to being interrupted, based on a mode parameter received from the first electronic device 101 or previously stored in the memory 330. For example, in response to being coupled with the first electronic device 101 by the wired communication link 130, the second electronic device 102 may operate in a first mode state of outputting audio data received through the wired communication link 130 by using the audio module 370 (or the speaker 377). In response to not being coupled with the first electronic device 101 by the wired communication link 130, the second electronic device 102 may operate in a second mode state of outputting audio data received through the first wireless communication link 110 by using the audio module 370 (or the speaker 377). The second electronic device 102 may apply the same or similar audio output effect (e.g., a sound effect, a volume, an audio filter, etc.) in the first mode state and the second mode state.

The input device 350 may receive an instruction or data from a user. The input device 350 may be used to adjust a volume of an audio signal outputted through the electronic device 300 (e.g., the first electronic device 101 or the second electronic device 102), or reproduce next music. For example, the input device 350 may include a touch panel. The input unit 350 may sense a touch or hovering input of the finger and a pen. For another example, the input device 350 may include a physical key or a hard key. The input device 350 may provide the received input and data related with the received input, to the processor 310.

The power management module 380 may manage power supplied to the electronic device 300 (e.g., the first electronic device 101 or the second electronic device 102). For example, the power management module 380 may be configured as at least a part of a power management integrated circuitry (PMIC).

The power management module 380 may measure a level of the battery 388 of the electronic device 300. The power management module 380 may provide the processor 310 with information on the level of the battery 388 of the electronic device 300. The information on the level of the battery 388 of the electronic device 300 may be transmitted to the audio source device 103. The information on the level of the battery 388 of the electronic device 300 may be used to identify whether the electronic device 300 will perform a master operation. For example, in response to the level of the battery 388 of the electronic device 300 (e.g., the first electronic device 101) performing the master operation being less by a designated amount than a level of a battery of another electronic device (e.g., the second electronic device 102) performing a slave operation, the electronic device 300 may perform the slave operation and another electronic device may perform the master operation. Likewise, in response to the level of the battery 388 of the electronic device 300 (e.g., the second electronic device 102) performing the slave operation being equal to or is more by a designated amount than the level of the battery of another electronic device (e.g., the second electronic device 102) performing the master operation, the electronic device 300 may perform the master operation and another electronic device may perform the slave operation.

The battery 388 may supply power to at least one constituent element of the electronic device 300. In response to the electronic device 300 being mounted (or coupled) on a designated charging device, the battery 388 may be charged. For another example, in response to the cable 230 being mounted on the connector hole 291, the battery 388 may be charged through the interface 360. In response to the interface 360 of the electronic device 300 being connected with the interface of the cable 230 through the connector hole 291, the battery 388 may be charged.

Figure 4A:
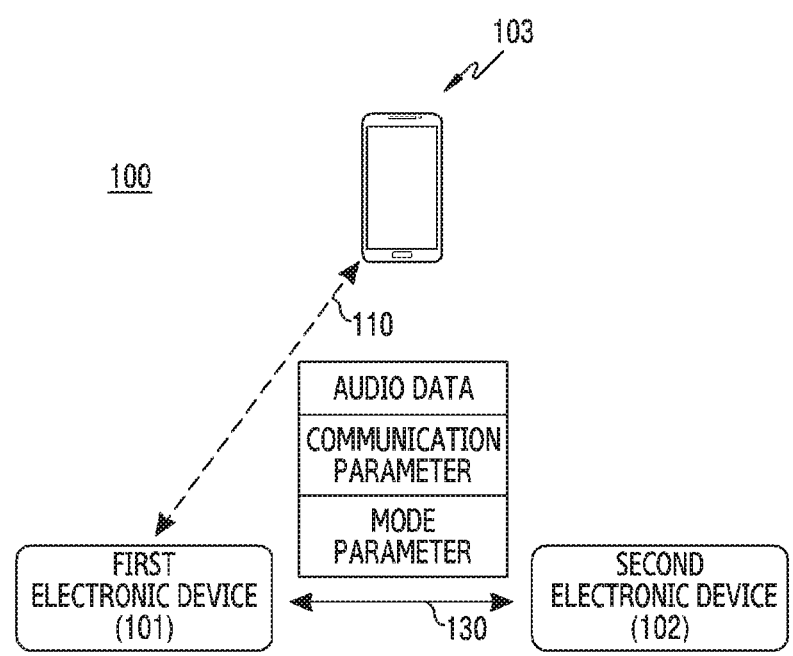
FIG. 4A illustrates an example of an operation in response to a first electronic device and a second electronic device being wiredly coupled with each other according to an embodiment of the disclosure.

FIG. 4A illustrates an example of an operation in response to a first electronic device and a second electronic device being wiredly coupled with each other according to an embodiment of the disclosure.

Referring to FIG. 4A, the first electronic device 101 and the second electronic device 102 may establish the wired communication link 130. For example, as illustrated in FIG. 2A, in response to the first electronic device 101 and the second electronic device 102 being coupled by the cable 230, the wired communication link 130 may be established.

In response to the first electronic device 101 among the first electronic device 101 and the second electronic device 102 performing a master operation, the first electronic device 101 may establish the first wireless communication link 110 with the audio source device 103. The establishing of the first wireless communication link 110 may be performed based at least on a user input in order to output, through the first electronic device 101 and the second electronic device 102, audio data reproduced in the audio source device 103. For example, in response to the first wireless communication link 110 being established according to a Bluetooth protocol, the establishing of the first wireless communication link 110 may correspond to BT pairing. For another example, the first wireless communication link 110 may be established according to a non-standard Bluetooth protocol or non-Bluetooth protocol as well. In response to the first wireless communication link 110 being established, the first electronic device 101 may acquire (or identify) a communication parameter on the first wireless communication link 110.

The first electronic device 101 may receive audio data reproduced in the audio source device 103, from the audio source device 103 through the first wireless communication link 110. The first electronic device 101 may transmit at least a part of the received audio data to the second electronic device 102 through the wired communication link 130, based at least on identifying that the first electronic device 101 forms the wired communication link 130 with the second electronic device 102.

For example, after decoding the received audio data, the first electronic device 101 may output at least a part (e.g., audio data on a left channel) of the decoded audio data through the speaker of the first electronic device 101 according to configuration information (e.g., ID representing that it is a left ear bud) of the first electronic device 101, and transmit the remnant part (e.g., audio data on a right channel) of the decoded audio data to the second electronic device 102 through the wired communication link 130. The second electronic device 102 may output the received audio data through the speaker of the second electronic device 102. However, it is not limited to this and, after decoding only the at least part (e.g., the audio data on the left channel) of the received audio data, the first electronic device 101 may output the decoded at least part of the received audio data through the speaker of the first electronic device 101, and transmit the remnant part of the received audio data or the received audio data to the second electronic device 102 through the wired communication link 130 as well. The second electronic device 102 may decode the received audio data and then, output the decoded audio data through the speaker of the second electronic device 102. The second electronic device 102 may output an audio signal generally at the same time as the first electronic device 101 outputs an audio signal.

The first electronic device 101 may transmit a communication parameter or mode parameter to the second electronic device 102 through the wired communication link 130, based at least on identifying that the first electronic device 101 forms the wired communication link 130 with the second electronic device 102. For example, in response to identifying that the first wireless communication link 110 is established, the first electronic device 101 may transmit the communication parameter or mode parameter to the second electronic device 102 through the wired communication link 130. For another example, the first electronic device 101 may periodically or non-periodically transmit the communication parameter or mode parameter to the second electronic device 102 through the wired communication link 130. For further example, the first electronic device 101 may transmit the communication parameter or mode parameter to the second electronic device 102 through the wired communication link 130, based at least on a user input. The communication parameter may further include information for, in response to the wired communication link 130 being interrupted, establishing the second wireless communication link 120 by the first electronic device 101 and the second electronic device 102. For example, the communication parameter may further include ID of the first electronic device 101 and address information thereof.

The communication parameter and the mode parameter may be simultaneously transmitted as one packet from the first electronic device 101 to the second electronic device 102 as well, and may be transmitted generally at the same time as well, or may be transmitted mutually independently as well. The first electronic device 101 and the second electronic device 102 may output an audio signal to which the same (or generally same) sound effect or audio filter is applied by using the mode parameter.

By establishing the wired communication link 130, the first electronic device 101 and the second electronic device 102 may operate in a state in which the wireless communication modules of the first electronic device 101 and the second electronic device 102 are inactivated, and may reduce current consumption. By establishing the wired communication link 130, the first electronic device 101 and the second electronic device 102 may perform a charging operation as well.

Figure 4B:
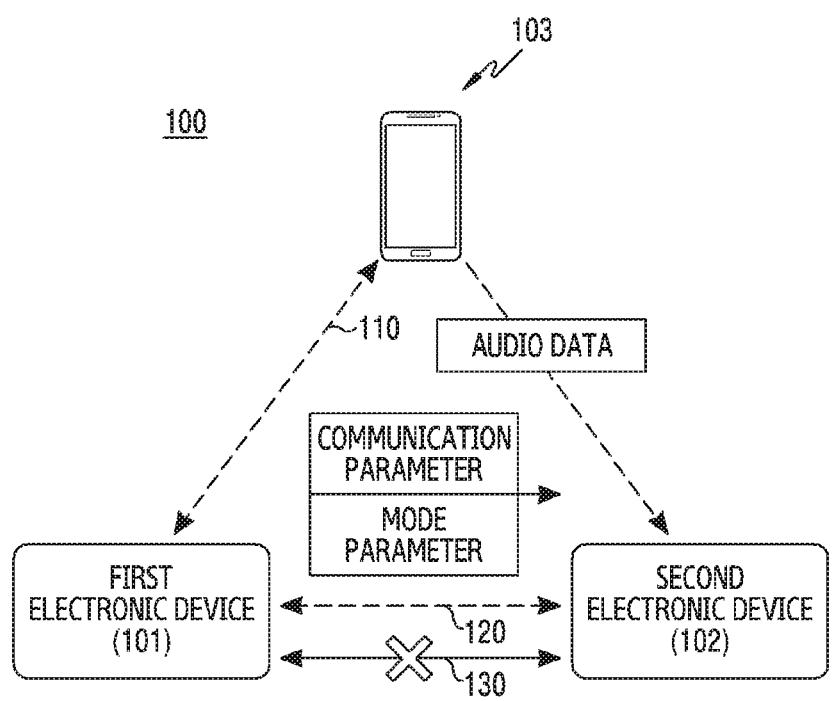
FIG. 4B illustrates an example of an operation in response to a first electronic device and a second electronic device being wirelessly coupled with each other according to an embodiment of the disclosure.

FIG. 4B illustrates an example of an operation in response to a first electronic device and a second electronic device being wirelessly coupled with each other according to an embodiment of the disclosure.

Referring to FIG. 4B, the first electronic device 101 and the second electronic device 102 may establish the second wireless communication link 120 in place of the wired communication link 130. In response to the first electronic device 101 and the second electronic device 102 being coupled by the second wireless communication link 120, the communication parameter (or additionally the mode parameter) may be transmitted from the first electronic device 101 to the second electronic device 102 through the second wireless communication link 120 instead of the wired communication link 130.

In response to the first electronic device 101 and the second electronic device 102 being coupled by the second wireless communication link 120, the first electronic device 101 performing a master operation may not transmit audio data received from the audio source device 103, to the second electronic device 102. The second electronic device 102 may receive audio data that the audio source device 103 transmits to the first electronic device 101 through the first wireless communication link 110, from the audio source device 103 by using the communication parameter on the first wireless communication link 110. By using the communication parameter to access and observe the first wireless communication link 110, the second electronic device 102 may receive audio data transmitted through the first wireless communication link 110.

The first electronic device 101 may decrease current consumption or battery consumption, in that the first electronic device 101 does not need to transmit audio data received from the audio source device 103, to the second electronic device.

Figure 5:
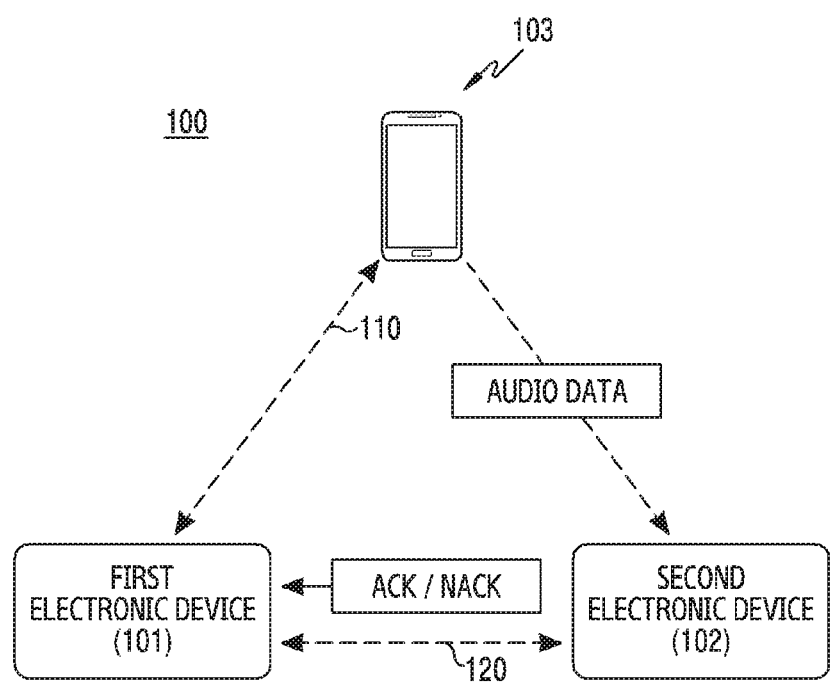
FIG. 5 illustrates an example of an operation of transmitting, by a second electronic device, a response representing reception or non-reception of audio data according to an embodiment of the disclosure.

FIG. 5 illustrates an example of an operation of transmitting, by a second electronic device, a response representing reception or non-reception of audio data according to an embodiment of the disclosure.

Referring to FIG. 5, the second electronic device 102 may receive (or sniff) audio data from the first wireless communication link 110 through a wireless communication module of the second electronic device 102. The second electronic device 102 may transmit a response (e.g., ACK or NACK) representing whether it has successfully received the audio data, to the first electronic device 101 through the second wireless communication link 120.

In various embodiments, the audio source device 103 may divide and transmit audio data, by the unit of packet, to the first electronic device 101 through the first wireless communication link 110. For example, the audio source device 103 may periodically (or cyclically) transmit an audio data packet to the first electronic device 101 through the first wireless communication link 110. The second electronic device 102 may receive the periodically (or cyclically) transmitted audio data packet from the first wireless communication link 110.

In response to successfully receiving an arbitrary audio data packet, the second electronic device 102 may transmit a response (ACK) representing that it successfully receives the audio data packet, to the first electronic device 101 through the second wireless communication link 120. In response to failing to successfully receive the arbitrary audio data packet, the second electronic device 102 may transmit a response (NACK) representing that it fails to receive the audio data packet, to the first electronic device 101 through the second wireless communication link 120.

In response to all of the first electronic device 101 and the second electronic device 102 successfully receiving the audio data packet, the first electronic device 101 may transmit an ACK to the audio source device 103 through the first wireless communication link 110. In response to even one of the first electronic device 101 and the second electronic device 102 not successfully receive the audio packet, the first electronic device 101 may transmit a NACK to the audio source device 103 through the first wireless communication link 110.

In response to receiving the NACK from the first electronic device 101, the audio source device 103 may retransmit a corresponding audio data packet to the first electronic device 101 through the first wireless communication link 110. By performing the aforementioned operations, the first electronic device 101 and the second electronic device 102 may receive all audio data packet without omitting.

An electronic device (e.g., the second electronic device 102) according to various embodiments as described above may include an interface circuitry (e.g., the interface 360) configured to be coupled with a first external electronic device (e.g., the first electronic device 101) through a wired communication link (e.g., the wired communication link 130), and a wireless communication circuitry (e.g., the wireless communication module 390), and a processor (e.g., the processor 310), and the processor may be configured to, in response to being coupled with the first external electronic device through the interface circuitry by the wired communication link, receive, from the first external electronic device through the interface circuitry, at least partial audio data among audio data that a second external electronic device (e.g., the audio source device 103) has transmitted to the first external electronic device through a first wireless communication link (e.g., the first wireless communication link 110) with the first external electronic device, and in response to the wired communication link with the first external electronic device being disconnected, receive, from the second external electronic device through the wireless communication circuitry, at least partial audio data among the audio data that the second external electronic device has transmitted to the first external electronic device through the first wireless communication link, by using configuration information (e.g., the communication parameter) corresponding to the first wireless communication link, and output an audio signal corresponding to the at least partial audio data.

In various embodiments, the processor may be configured to receive the configuration information from the first external electronic device (e.g., the first electronic device 101) through the wired communication link (e.g., the wired communication link 130).

In various embodiments, the processor may be configured to, in response to the wired communication link being disconnected, establish a second wireless communication link (e.g., the second wireless communication link 120) with the first external electronic device by using the wireless communication circuitry, and receive the configuration information through the second wireless communication link.

In various embodiments, the processor may be configured to transmit data about reception or non-reception of the at least partial audio data, to the first external electronic device.

In various embodiments, the processor may be configured to charge a battery (e.g., the battery 388) of the electronic device through the interface circuitry, based at least on that the wired communication link is connected.

In various embodiments, the configuration information may include information for accessing, by the electronic device, the first wireless communication link by using the wireless communication circuitry.

In various embodiments, the processor may be further configured to receive data about information that is used to process the audio data, from the first external electronic device. For example, the information being used to process the audio data may include at least one information among information on a channel of the audio data, information on an output intensity of the audio data, information on a sound effect applied to the audio data, or information on a filter applied to the audio data.

In various embodiments, the configuration information may further include information for, in response to the wired communication link being disconnected, forming a second wireless communication link (e.g., the second wireless communication link 120) with the first external electronic device by using the wireless communication circuitry.

An electronic device (e.g., the first electronic device 101) according to various embodiments as described above may include an interface circuitry (e.g., the interface 360) configured to be coupled with a first external electronic device (e.g., the second electronic device 102) through a wired communication link (e.g., the wired communication link 130), a wireless communication circuitry (e.g., the wireless communication module 390), and a processor (e.g., the processor 310), wherein the processor may be configured to, in response to being coupled with the first external electronic device through the interface circuitry by the wired communication link, transmit, to the first external electronic device through the interface circuitry, at least partial audio data among audio data that is received from a second external electronic device (e.g., the audio source device 103) through a first wireless communication link (e.g., the first wireless communication link 110), transmit configuration information (e.g., the communication parameter) related with the first wireless communication link to the first external electronic device, wherein, in response to the wired communication link being disconnected, the first external electronic device acquires the at least partial audio data from the second external electronic device by using the configuration information, and output an audio signal corresponding to another at least partial audio data among the received audio data.

In various embodiments, the processor may be configured to transmit the configuration information to the first external electronic device through the wired communication link.

In various embodiments, the processor may be configured to, in response to the wired communication link being disconnected, establish a second wireless communication link (e.g., the second wireless communication link 120) with the first external electronic device by using the wireless communication circuitry, and transmit the configuration information to the first external electronic device through the second wireless communication link.

Figure 6:
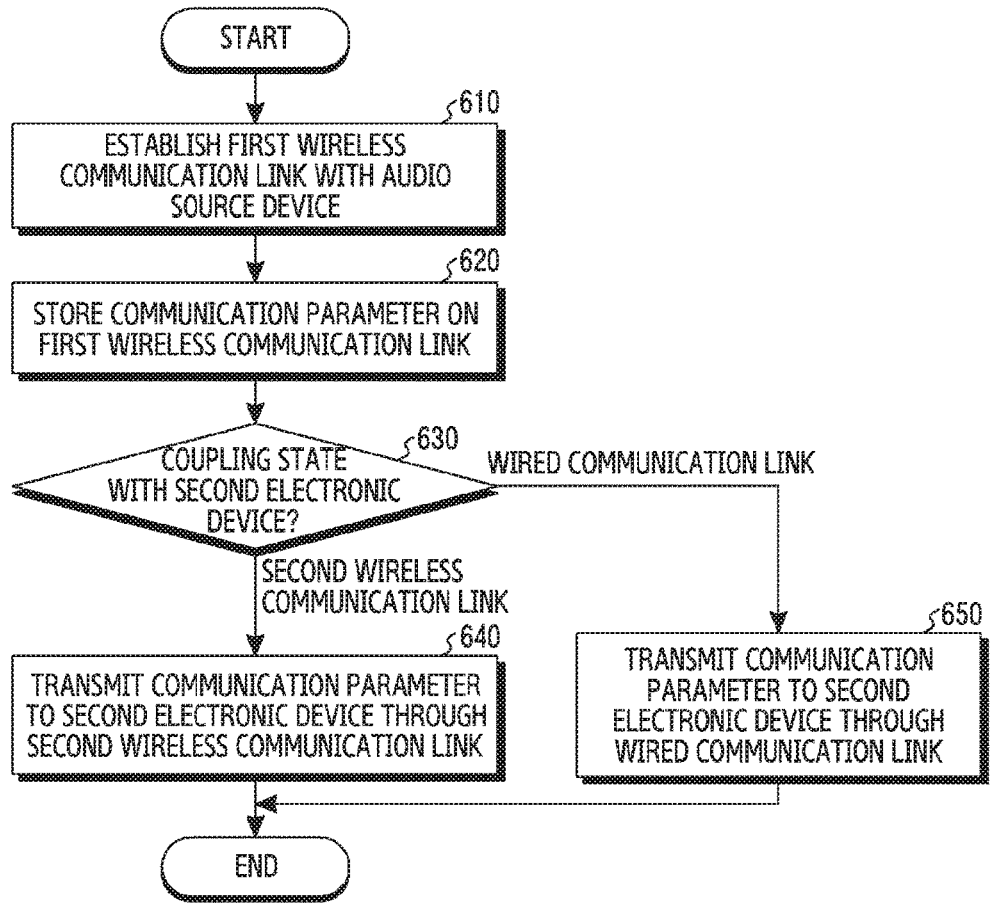
FIG. 6 illustrates an example of an operation of transmitting, by a first electronic device, a communication parameter to a second electronic device according to an embodiment of the disclosure.

FIG. 6 illustrates an example of an operation of transmitting, by a first electronic device, a communication parameter to a second electronic device according to an embodiment of the disclosure. The operations shown in FIG. 6 can be performed, for example, by the first electronic device 101.

Referring to FIG. 6, in operation 610, the processor 310 of the first electronic device 101 may establish (e.g., BT pairing) the first wireless communication link 110 with the audio source device 103. For example, the first electronic device 101 may be displayed in a UI of the audio source device 103, based at least on ID broadcasted by the first electronic device 101. The audio source device 103 may receive a user input for establishing the first wireless communication link 110 with the first electronic device 101. In response to receiving the user input, the audio source device 103 may transmit a request for establishing the first wireless communication link 110 to the first electronic device 101. In response to the first electronic device 101 receiving and accepting the request, the first wireless communication link 110 may be established.

In operation 620, the processor 310 of the first electronic device 101 may store a communication parameter on the first wireless communication link 110. For example, the first electronic device 101 may identify or acquire the communication parameter, based at least on establishing the first wireless communication link 110. The communication parameter, which is information on the first wireless communication link 110 established between the first electronic device 101 and the audio source device 103, may be used to receive, by the second electronic device 102, audio data from the first wireless communication link 110.

In operation 630, the processor 310 of the first electronic device 101 may identify a coupling state with the second electronic device 102. The processor 310 may identify whether the first electronic device 101 has been coupled with the second electronic device 102 by the wired communication link 130 through the interface of the first electronic device 101, or whether it has been coupled with the second electronic device 102 by the second wireless communication link 120 through the wireless communication module of the first electronic device 101. In some embodiments, in response to the first electronic device 101 and the second electronic device 102 not being coupled by the wired communication link 130, in response to identifying that the first electronic device 101 establishes the first wireless communication link 110 with the audio source device 103, the first electronic device 101 may establish the second wireless communication link 120 with the second electronic device 102.

In response to identifying that the first electronic device 101 is coupled with the second electronic device 102 by the wired communication link 130, in operation 650, the first electronic device 101 may transmit the communication parameter to the second electronic device 102 through the wired communication link 130. The communication parameter may be used to receive, by the second electronic device 102, audio data from the first wireless communication link 110.

In response to identifying that the first electronic device 101 is coupled with the second electronic device 102 by the second wireless communication link 120, in operation 640, the first electronic device 101 may transmit the communication parameter to the second electronic device 102 through the second wireless communication link 120.

Figure 7:
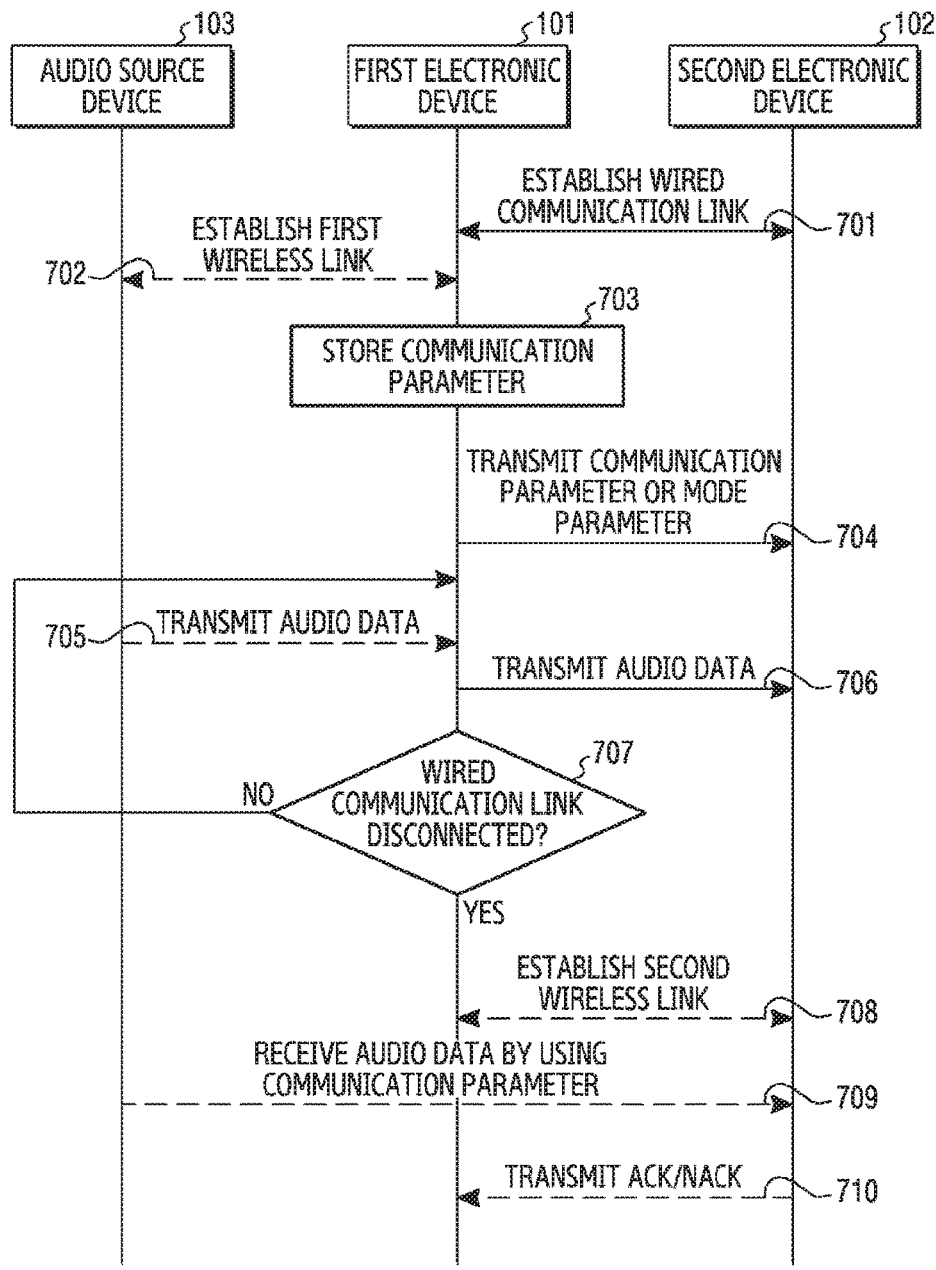
FIG. 7 illustrates an example of a signal flow between a first electronic device, a second electronic device, and an audio source device according to an embodiment of the disclosure.

FIG. 7 illustrates an example of a signal flow between a first electronic device, a second electronic device, and an audio source device according to an embodiment of the disclosure.

Referring to FIG. 7, in operation 701, the first electronic device 101 and the second electronic device 102 may establish the wired communication link 130. For example, as illustrated in FIG. 2A, the first electronic device 101 and the second electronic device 102 may be in a state of being coupled by the cable 230.

In operation 702, the first electronic device 101 may establish (e.g., BT pairing) the first wireless communication link 110 with the audio source device 103, as a master operation. In response to establishing the first wireless communication link 110, the first electronic device 101 may identify or acquire a communication parameter that is information on the first wireless communication link 110.

In operation 703, the first electronic device 101 may store the communication parameter.

In operation 704, the first electronic device 101 may transmit the communication parameter to the second electronic device 102 through the wired communication link 130. For example, the communication parameter may be changed whenever the first wireless communication link 110 is established and therefore, in response to identifying that the first wireless communication link 110 is established, the first electronic device 101 may transmit the communication parameter to the second electronic device 102 through the wired communication link 130. The communication parameter may further include information (e.g., ID and address information of the first electronic device 101) for, in response to the wired communication link 130 being thereafter disconnected, establishing, by the second electronic device 102, the second wireless communication link 120 (e.g., BT pairing) with the first electronic device 101. The first electronic device 101 may transmit the mode parameter as well as the communication parameter to the second electronic device 102 through the wired communication link 130 as well. Since the mode parameter may be changed according to setting of an application executed in the audio source device 103 or according to a user input, the first electronic device 101 may periodically transmit the mode parameter to the second electronic device 102 through the wired communication link 130. However, it is not limited to this, and the communication parameter or mode parameter may be periodically or non-periodically transmitted from the first electronic device 101 to the second electronic device 102.

In operation 705, the audio source device 103 may transmit audio data reproduced in the audio source device 103, to the first electronic device 101 through the first wireless communication link 110.

In operation 706, the first electronic device 101 may transmit at least a part of the received audio data to the second electronic device 102 through the wired communication link 130. For example, in response to configuration information of the first electronic device 101 representing that it is a left ear bud, the first electronic device 101 may output an audio signal corresponding to a left channel among the received stereo audio data through the speaker, and transmit an audio signal corresponding to a right channel to the second electronic device 102 through the wired communication link 130. For another example, in response to the configuration information of the first electronic device 101 representing that it is the left ear bud, the first electronic device 101 may transmit the received stereo audio data to the second electronic device 102 through the wired communication link 130, and output the audio signal corresponding to the left channel through the speaker. In response to configuration information of the second electronic device 102 representing that it is a right ear bud, the second electronic device 102 may output, through the speaker, an audio signal corresponding to a right channel among the stereo audio data received through wired communication link 130.

The audio signal outputted from the first electronic device 101 and the audio signal outputted from the second electronic device 102 may be outputted generally at the same time.

In operation 707, the first electronic device 101 may identify whether the wired communication link 130 is disconnected through the interface of the first electronic device 101. The first electronic device 101 may repeatedly perform operation 705 and operation 706 of, until before identifying that the wired communication link 130 is disconnected, outputting at least a part of audio data received from the audio source device 103, and transmitting at least a part of the received audio data to the second electronic device 102 through the wired communication link 130.

In response to identifying that the wired communication link 130 is disconnected, in operation 708, the first electronic device 101 may establish the second wireless communication link 120 with the second electronic device 102. For example, in response to identifying that the wired communication link 130 is disconnected, the first electronic device 101 may transmit a request for establishing the second wireless communication link 120 to the second electronic device 102 through the wireless communication module of the first electronic device 101. Meantime, in response to identifying that the wired communication link 130 is disconnected, the second electronic device 102 may activate (e.g., on) the wireless communication module of the second electronic device 102. The second electronic device 102 may receive and accept the request through the wireless communication module of the second electronic device 102. In response to the second electronic device 102 accepting the request, the second wireless communication link 120 may be established.

For another example, the second electronic device 102 may identify whether the wired communication link 130 has been disconnected, through the interface of the second electronic device 102 as well. The second electronic device 102 may transmit, through the wireless communication module of the second electronic device 102, a request for establishing the second wireless communication link 120 to the first electronic device 101, by using ID and address information of the first electronic device 101 included in the communication parameter. The first electronic device 101 may receive and accept the request. In response to the first electronic device 101 accepting the request, the second wireless communication link 120 may be established.

In operation 709, the second electronic device 102 may receive the audio data, which is transmitted from the audio source device 103 through the first wireless communication link 110, by using the communication parameter received through operation 704. For example, even while the wired communication link 130 is disconnected and the second wireless communication link 120 is established in operation 708, the first electronic device 101 may keep receiving audio data from the audio source device 103 and outputting the received audio data. That is, operation 705 may be continuously performed even while operations 706 to 710 are performed.

In response to the wired communication link 130 being disconnected, the second electronic device 102 may no longer receive audio data from the first electronic device 101 through the wired communication link 130. In response to identifying the disconnecting of the wired communication link 130, the second electronic device 102 may observe the first wireless communication link 110 by using the wireless communication module of the second electronic device 102, receive audio data which is transmitted from the audio source device 103 to the first electronic device 101 through the first wireless communication link 110, and output the received audio data. Even in response to the wired communication link 130 being disconnected (i.e., even in response to it moves onto operation 708 from operation 707), the second electronic device 102 may consecutively (or seamlessly) receive and output audio data. Operations 708 and 709 may be performed in parallel or independently, and their order may be changed.

In response to outputting audio data that is received from the first wireless communication link 110 in operation 709 and in response to outputting audio data that is received from the first electronic device 101 through the wired communication link 130 in operation 706, the second electronic device 102 may apply the same audio effect (e.g., sound effect, filter applying, volume configuration, output intensity, etc.) by the mode parameter.

In operation 710, the second electronic device 102 may transmit a response (e.g., ACK or NACK) representing whether it has normally received the audio data, to the first electronic device 101 through the second wireless communication link 120.

In response to even one of the first electronic device 101 and the second electronic device 102 failing to normally receive the audio data, the first electronic device 101 may transmit a NACK to the audio source device 103 through the first wireless communication link 110. In response to receiving the NACK from the first electronic device 101 through the first wireless communication link 110, the audio source device 103 may re-transmit corresponding audio data, and the first electronic device 101 and the second electronic device 102 may receive the audio data without omission.

Figure 8:
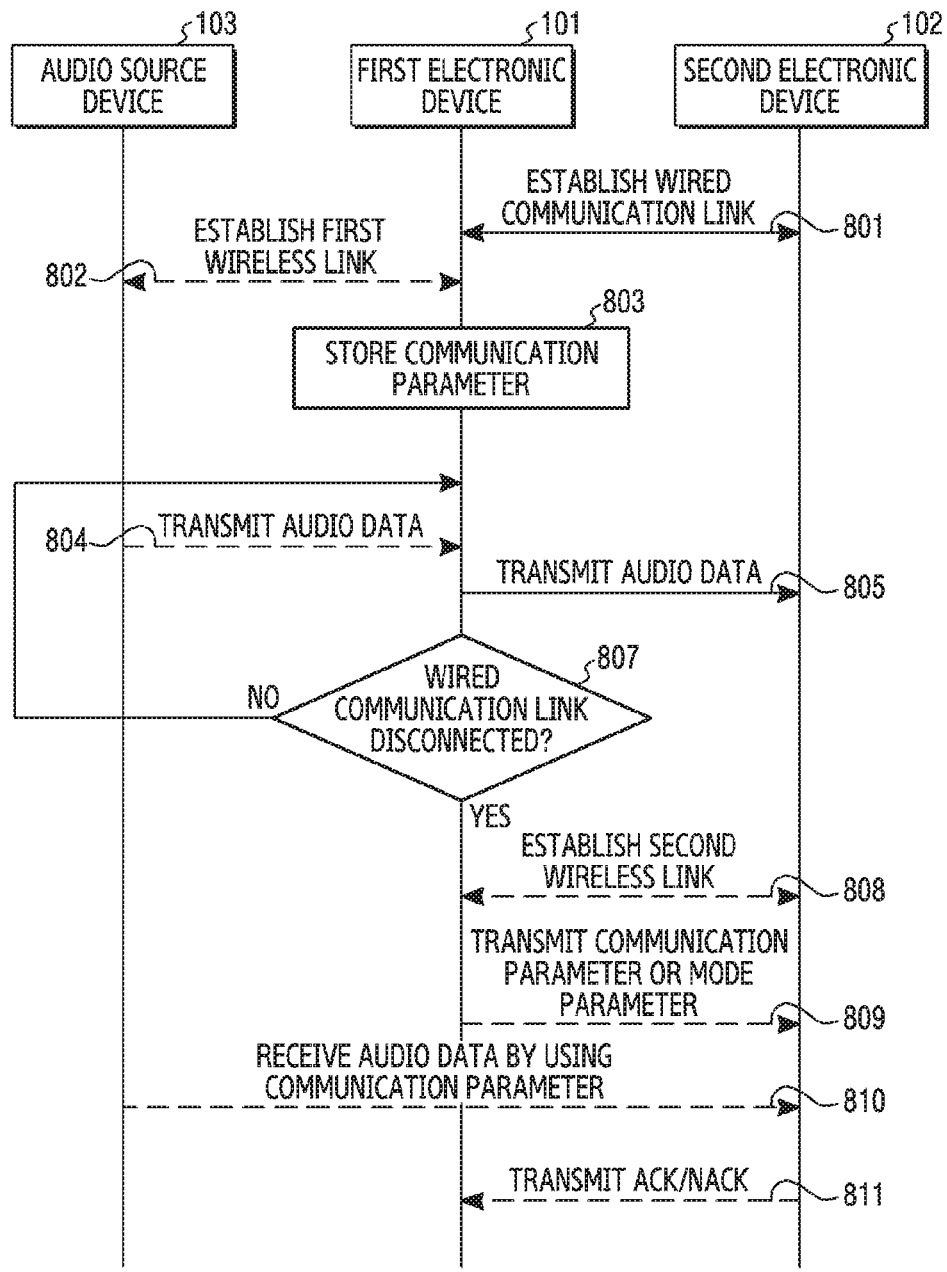
FIG. 8 illustrates another example of a signal flow between a first electronic device, a second electronic device, and an audio source device according to an embodiment of the disclosure.

FIG. 8 illustrates another example of a signal flow between a first electronic device, a second electronic device, and an audio source device according to an embodiment of the disclosure.

Referring to FIG. 8, in operation 801 the first electronic device 101 and the second electronic device 102 may establish the wired communication link 130. For example, as illustrated in FIG. 2A, the first electronic device 101 and the second electronic device 102 may be in a state of being coupled by the cable 230.

In operation 802, the first electronic device 101 may establish (e.g., BT pairing) the first wireless communication link 110 with the audio source device 103, as a master operation. In response to establishing the first wireless communication link 110, the first electronic device 101 may identify or acquire a communication parameter being information on the first wireless communication link 110.

In operation 803, the first electronic device 101 may store the communication parameter.

In operation 804, the audio source device 103 may transmit audio data reproduced in the audio source device 103, to the first electronic device 101 through the first wireless communication link 110.

In operation 805, the first electronic device 101 may transmit at least a part of the received audio data to the second electronic device 102 through the wired communication link 130. The first electronic device 101 and the second electronic device 102 may generally simultaneously output audio signals corresponding to at least parts of the respectively received audio data.

In operation 807, the first electronic device 101 may identify whether the wired communication link 130 is disconnected through the interface of the first electronic device 101. The first electronic device 101 may repeatedly perform operation 804 and operation 805 of, until before identifying that the wired communication link 130 is disconnected, outputting at least a part of audio data received from the audio source device 103, and transmitting at least a part of the received audio data to the second electronic device 102 through the wired communication link 130.

In response to identifying that the wired communication link 130 is disconnected, in operation 808, the first electronic device 101 may establish the second wireless communication link 120 with the second electronic device 102.

In operation 809, in response to identifying that the second wireless communication link 120 is established, the first electronic device 101 may transmit the communication parameter to the second electronic device 102 through the second wireless communication link 120. The first electronic device 101 may transmit a mode parameter as well as the communication parameter to the second electronic device 102 through the wired communication link 130. The first electronic device 101 may periodically or non-periodically transmit the communication parameter or mode parameter to the second electronic device 102 through the second wireless communication link 120. The communication parameter and the mode parameter may be transmitted as one packet at the same time as well, or may be transmitted mutually independently as well.

In operation 810, the second electronic device 102 may receive the audio data transmitted from the audio source device 103 through the first wireless communication link 110, by using the communication parameter received through the second wireless communication link 120. For example, even while the wired communication link 130 is disconnected, and the second wireless communication link 120 is established in operation 808, and the communication parameter or mode parameter is transmitted to the second electronic device 102 in operation 809, the first electronic device 101 may keep receiving audio data from the audio source device 103 and outputting the received audio data. That is, operation 804 may be continuously performed even while operations 807 to 811 are performed.

In response to the wired communication link 130 being disconnected, the second electronic device 102 may no longer receive audio data from the first electronic device 101 through the wired communication link 130. In response to identifying the disconnecting of the wired communication link 130, the second electronic device 102 may observe the first wireless communication link 110 by using the wireless communication module of the second electronic device 102, and receive and output audio data which is transmitted from the audio source device 103 to the first electronic device 101 through the first wireless communication link 110. Even in response to the wired communication link 130 being disconnected (i.e., even in response to moving onto operation 808 from operation 807), the second electronic device 102 may continuously (or seamlessly) receive and output audio data.

In response to outputting audio data that is received from the first wireless communication link 110 in operation 810 and in response to outputting audio data that is received from the first electronic device 101 through the wired communication link 130 in operation 805, the second electronic device 102 may apply the same audio effect (e.g., sound effect, filter applying, volume configuration, output intensity, etc.) by the mode parameter.

In operation 811, the second electronic device 102 may transmit a response (e.g., ACK or NACK) representing whether it has normally received the audio data, to the first electronic device 101 through the second wireless communication link 120.

The first electronic device 101 and the second electronic device 102 according to various embodiments may form the first wired communication link 130 by using the detachable cable 230 as in FIG. 7 or FIG. 8, thereby performing a charging operation as well, and reducing current consumption. In various embodiments, in response to the wired communication link 130 being interrupted, the second electronic device 102 may receive the audio data by using the communication parameter, thereby decreasing the battery consumption of the first electronic device 101.

Figure 9:
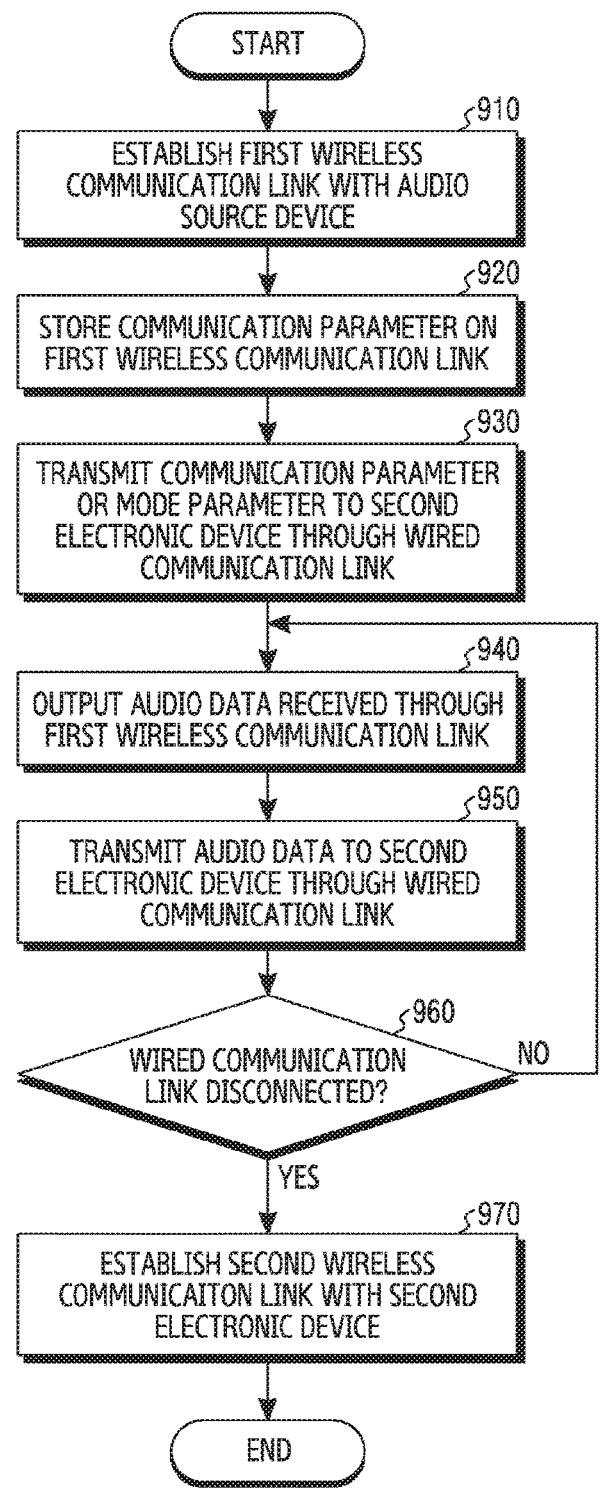
FIG. 9 illustrates an example of an operation of a first electronic device according to an embodiment of the disclosure.
Figure 10:
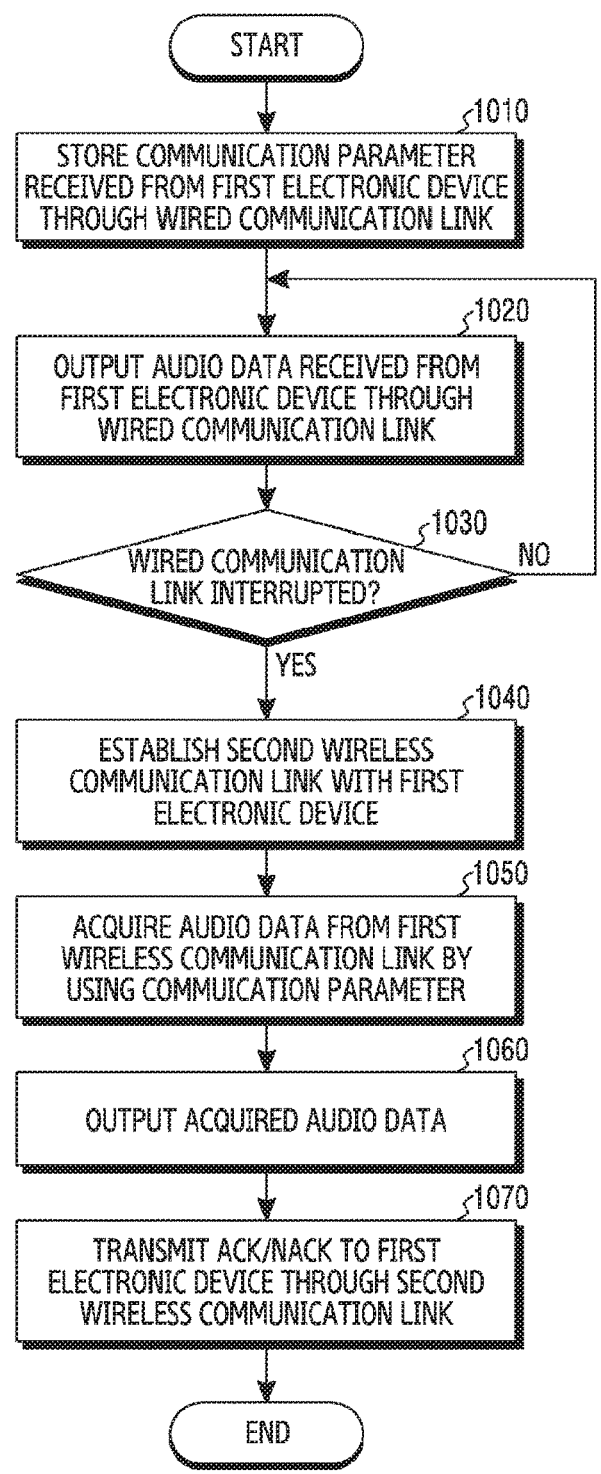
FIG. 10 illustrates an example of an operation of a second electronic device according to an embodiment of the disclosure.

The first electronic device 101 according to various embodiments may transmit the communication parameter or mode parameter to the second electronic device 102 through the wired communication link 130 as illustrated in FIG. 7 as well, and may transmit the same through the second wireless communication link 120 as illustrated in FIG. 8 as well. In FIGS. 9 to 10 described later, a description will be made for embodiments in which the first electronic device 101 transmits the communication parameter or mode parameter to the second electronic device 102 through the wired communication link 130 as illustrated in FIG. 7. However, even in FIGS. 9 to 10 described later, the first electronic device 101 may transmit the communication parameter or mode parameter to the second electronic device 102 even through the second wireless communication link 120 as illustrated in FIG. 8.

FIG. 9 illustrates an example of an operation of a first electronic device according to an embodiment of the disclosure. The first electronic device 101 may correspond to an electronic device performing a master operation. The first electronic device 101 and the second electronic device 102 may be in a state of being coupled by the wired communication link 130.

Referring to FIG. 9, in operation 910, the processor 310 of the first electronic device 101 may establish (e.g., BT pairing) the first wireless communication link 110 with the audio source device 103. For example, the processor 310 may broadcast ID of notifying that it may establish the first wireless communication link 110. The audio source device 103 may display the first electronic device 101 in a UI of the audio source device 103, based at least on the ID broadcasted by the processor 310, and may transmit a request for establishing the first wireless communication link 110 to the first electronic device 101, based at least on a user input. In response to the processor 310 receiving and accepting the request, the first wireless communication link 110 may be established.

In operation 920, the processor 310 of the first electronic device 101 may store a communication parameter on the first wireless communication link 110. For example, in response to identifying that the first wireless communication link 110 is established, the processor 310 may identify or acquire the communication parameter. The communication parameter may be information on the first wireless communication link 110 between the first electronic device 101 and the audio source device 103.

In operation 930, the processor 310 of the first electronic device 101 may transmit the communication parameter or a mode parameter to the second electronic device 102 through the wired communication link 130. For example, in response to identifying that the first wireless communication link 110 is established through the wireless communication module of the first electronic device 101, the processor 310 may transmit the communication parameter or mode parameter to the second electronic device 102 through the interface of the first electronic device 101. For another example, the processor 310 may periodically or non-periodically transmit the communication parameter or mode parameter to the second electronic device 102 through the interface of the first electronic device 101, based at least on identifying that the first wireless communication link 110 is established through the wireless communication module of the first electronic device 101.

In operation 940, the processor 310 of the first electronic device 101 may output, through the speaker, audio data that is received from the audio source device 103 through the first wireless communication link 110.

In operation 950, the processor 310 of the first electronic device 101 may transmit at least a part of the received audio data to the second electronic device 102 through the wired communication link 130.

In operation 960, the processor 310 of the first electronic device 101 may identify whether the wired communication link 130 is interrupted through the interface of the first electronic device 101. The processor 310 may repeatedly perform operation 940 and operation 950 until before identifying that the wired communication link 130 is interrupted.

In response to identifying that the wired communication link 130 is interrupted, in operation 970, the processor 310 of the first electronic device 101 may establish (e.g., BT pairing) the second wireless communication link 120 with the second electronic device 102. For example, in response to identifying that the wired communication link 130 is interrupted, the processor 310 may transmit a request for establishing the second wireless communication link 120 to the second electronic device 102. For another example, the processor 310 may receive and accept a request for establishing the second wireless communication link 120 from the second electronic device 102.

In response to establishing the second wireless communication link 120 with the second electronic device 102, the processor 310 may no longer transmit audio data to the second electronic device 102. In response to establishing the second wireless communication link 120 with the second electronic device 102, the processor 310 may continuously perform an operation of receiving audio data from the audio source device 103 and outputting the received audio data.

FIG. 10 illustrates an example of an operation of a second electronic device according to an embodiment of the disclosure. The second electronic device 102 may correspond to an electronic device performing a slave operation. The first electronic device 101 and the second electronic device 102 may be in a state of being coupled by the wired communication link 130.

Referring to FIG. 10, in operation 1010, the processor 310 of the second electronic device 102 may store a communication parameter that is received from the first electronic device 101 through the wired communication link 130.

In operation 1020, the processor 310 of the second electronic device 102 may receive audio data from the first electronic device 101 through the wired communication link 130, and output at least a part of the received audio data. The processor 310 may output audio data generally at the same time as the first electronic device 101 outputs audio data.

In operation 1030, the processor 310 of the second electronic device 102 may identify whether the wired communication link 130 with the first electronic device 101 is interrupted. The processor 310 may repeatedly perform operation 1020 until before identifying that the wired communication link 130 is interrupted.

In response to identifying that the wired communication link 130 is interrupted, in operation 1040, the processor 310 of the second electronic device 102 may establish the second wireless communication link 120 with the first electronic device 101. For example, the processor 310 may transmit a request for establishing the second wireless communication link 120, to the first electronic device 101 by using ID or address information of the first electronic device 101. For another example, the processor 310 may receive and accept a request for establishing the second wireless communication link 120 from the first electronic device 101. In some embodiments, the processor 310 may receive (and store) the communication parameter from the first electronic device 101, through the established second wireless communication link 120 as well.

In operation 1050, the processor 310 of the second electronic device 102 may acquire audio data that the audio source device 103 transmits to the first electronic device 101, from the first wireless communication link 110 by using the communication parameter.

In operation 1060, the processor 310 of the second electronic device 102 may output at least a part (e.g., audio data on a right channel) of the acquired audio data, through the speaker of the second electronic device 102.

In operation 1070, the processor 310 of the second electronic device 102 may transmit a response (e.g., ACK or NACK) representing whether it has successfully received the audio data, to the first electronic device 101 through the second wireless communication link 120.

In some embodiments, in operations 1010 to 1030, the wireless communication module of the second electronic device 102 may be in an inactivated (e.g., off) state. In operations 1040 to 1070, the wireless communication module of the second electronic device 102 may be in an activated (e.g., on) state. The second electronic device 102 may decrease battery consumption by using the wireless communication link 130. Even after the wired communication link 130 is interrupted, the second electronic device 102 may receive audio data from the audio source device 103 (or the first wireless communication link 110) by using the communication parameter, thereby decreasing the battery consumption of the first electronic device 101.

Figure 11:
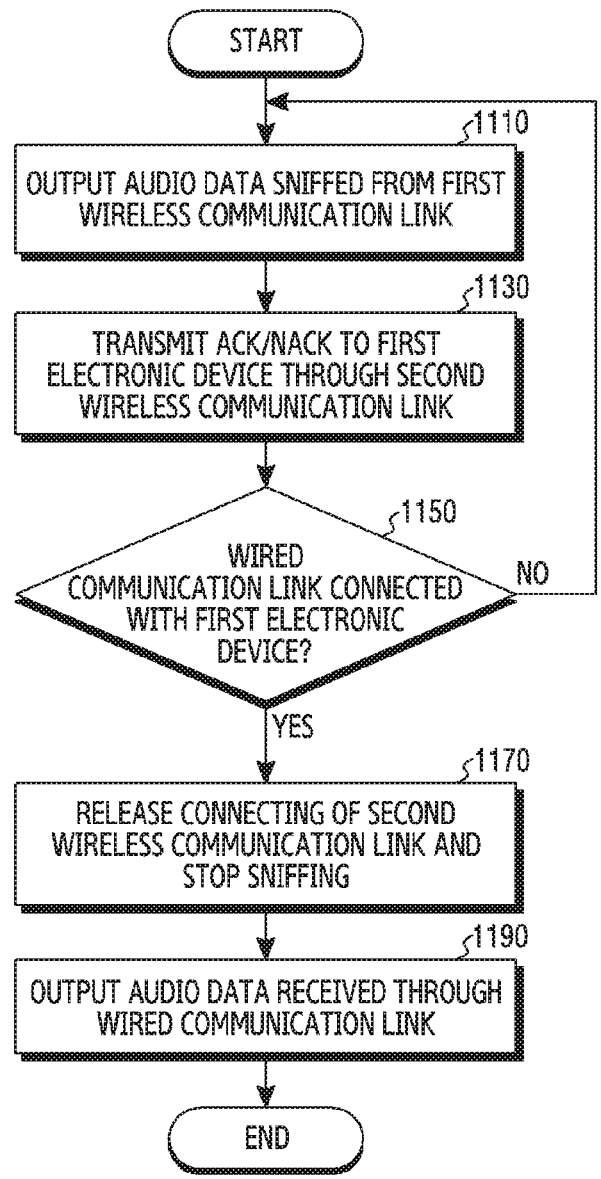
FIG. 11 illustrates another example of an operation of a second electronic device according to an embodiment of the disclosure.

FIG. 11 illustrates another example of an operation of a second electronic device according to an embodiment of the disclosure. The second electronic device 102 may correspond to an electronic device performing a slave operation. The first electronic device 101 and the second electronic device 102 may be in a state of being coupled by the second wireless communication link 120.

Referring to FIG. 11, in operation 1110, by using the communication parameter, the processor 310 of the second electronic device 102 may acquire (or sniff) audio data that the audio source device 103 transmits to the first electronic device 101 through the first wireless communication link 110. For example, the communication parameter may be one that is received from the first electronic device 101 to the second electronic device 102 through the second wireless communication link 120 in response to identifying that the first electronic device 101 establishes (e.g., BT pairing) the first wireless communication link 110 with the audio source device 103. The processor 310 may acquire (or sniff) audio data from the first wireless communication link 130 by using the received communication parameter. The processor 310 may output the acquired audio data through the speaker of the second electronic device 102.

In operation 1130, the processor 310 of the second electronic device 102 may transmit a response (e.g., ACK or NACK) representing whether it has normally received the audio data, to the first electronic device 101 through the second wireless communication link 120.

In operation 1150, the processor 310 of the second electronic device 102 may identify whether the wired communication link 130 is connected with the first electronic device 101 through the interface of the second electronic device 102. The processor 310 may repeatedly perform operations 1110 and 1130, until before identifying that the wired communication link 130 with the first electronic device 101 is connected.

In response to identifying that the wired communication link 130 with the first electronic device 101 is connected, in operation 1170, the processor 310 of the second electronic device 102 may release the connecting of the second wireless communication link 120 (e.g., BT pairing). For example, the processor 310 may inactivate (e.g., off) the wireless communication module of the second electronic device 102. The processor 310 may stop an operation of acquiring (or sniffing) audio data from the first wireless communication link 110.

In operation 1190, the processor 310 of the second electronic device 102 may receive audio data from the first electronic device 101 through the established wired communication link 130, and output the received audio data. For example, the processor 310 may receive, through the interface of the second electronic device 102, audio data on the one channel (e.g., right channel) among audio data that the first electronic device 101 has received, and output the received audio data through the speaker of the second electronic device 102.

In some embodiments, in response to the wired communication link 130 being established, the processor 310 of the second electronic device 102 may perform a charging operation through the interface 360 as well. For example, the processor 310 may charge the battery 388 of the second electronic device 102, based on identifying that the second electronic device 102 is coupled with the cable 230 through the connector hole 292. The charging operation may be identically performed even in the first electronic device 101.

An operation method of an electronic device (e.g., the second electronic device 102) according to various embodiments as described above may include, in response to being coupled with a first external electronic device (e.g., the first electronic device 101) by a wired communication link (e.g., the wired communication link 130), receiving, from the first external electronic device through an interface circuitry (e.g., the interface 360) of the electronic device, at least partial audio data among audio data that a second external electronic device (e.g., the audio source device 103) has transmitted to the first external electronic device through a first wireless communication link (e.g., the first wireless communication link 110) with the first external electronic device, and in response to the wired communication link with the first external electronic device being disconnected, receiving, from the second external electronic device through a wireless communication circuitry (e.g., the wireless communication module 390) of the electronic device, at least partial audio data among the audio data that the second external electronic device has transmitted to the first external electronic device through the first wireless communication link, by using configuration information (e.g., the communication parameter) corresponding to the first wireless communication link, and outputting an audio signal corresponding to the at least partial audio data.

In various embodiments, the operation method of the electronic device may further include receiving the configuration information from the first external electronic device through the wired communication link.

In various embodiments, the operation method of the electronic device may further include, in response to the wired communication link being disconnected, establishing a second wireless communication link (e.g., the second wireless communication link 120) with the first external electronic device, and receiving the configuration information through the second wireless communication link.

In various embodiments, the operation method of the electronic device may further include transmitting data about reception or non-reception of the at least partial audio data, to the first external electronic device.

In various embodiments, the configuration information may include information for accessing, by the electronic device, the first wireless communication link by using the wireless communication circuitry.

In various embodiments, the operation method of the electronic device may further include receiving data about information that is used to process the audio data, from the first external electronic device. For example, the information being used to process the audio data may include at least one information among information on a channel of the audio data, information on an output intensity of the audio data, information on a sound effect applied to the audio data, or information on a filter applied to the audio data.

In various embodiments, the configuration information may further include information for, in response to the wired communication link being disconnected, forming a second wireless communication link (e.g., the second wireless communication link 120) with the first external electronic device by using the wireless communication circuitry.

Methods according to embodiments mentioned in claims of the disclosure or the specification may be implemented in the form of hardware, software, or a combination of the hardware and the software.

In response to being implemented by software, a computer-readable storage media storing one or more programs (i.e., software modules) may be provided. The one or more programs stored in the computer-readable storage media are configured to be executable by one or more processors within an electronic device. The one or more programs include instructions for enabling the electronic device to execute the methods of the embodiments stated in the claims of the disclosure or the specification.

This program (i.e., a software module, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of another form, and/or a magnetic cassette. Or, it may be stored in a memory that is constructed in combination of some of them or all. Also, each constructed memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may connect to a device performing an embodiment of the disclosure through an external port. Also, a separate storage device on the communication network may connect to the device performing the embodiment of the disclosure as well.

In the aforementioned concrete embodiments of the disclosure, constituent elements included in the disclosure have been expressed in the singular or plural according to a proposed concrete embodiment. But, the expression of the singular or plural is selected suitable to a given situation for the sake of description convenience, and the disclosure is not limited to singular or plural constituent elements. Even a constituent element expressed in the plural may be constructed in the singular, or even a constituent element expressed in the singular may be constructed in the plural.

An electronic device and method according to various embodiments may decrease a battery consumption of at least one of a master device or slave device by using a wired communication link between the master device and the slave device.

An electronic device and method according to various embodiments may minimize an operation of a master device, by enabling a slave device to sniff audio data in response to a wired communication link between the master device and the slave device being interrupted.

An electronic device and method according to various embodiments may seamlessly output audio data through a master device and a slave device, even in response to a wired communication link between the master device and the slave device being interrupted.

An effect obtainable from the disclosure is not limited to the above-mentioned effects, and other effects not mentioned will be able to be apparently understood from the following statement by a person having ordinary skill in the art to which the disclosure pertains.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
   an interface circuitry configured to be coupled with a first external electronic device through a wired communication link;
   a wireless communication circuitry; and
   a processor configured to:
      in response to being coupled with the first external electronic device through the interface circuitry by the wired communication link, receive, from the first external electronic device through the interface circuitry, at least partial audio data among audio data that a second external electronic device has trans- mitted to the first external electronic device through a first wireless communication link with the first external electronic device, in response to the wired communication link with the first external electronic device being disconnected, receive, from the second external electronic device through the wireless communication circuitry, at least partial audio data among the audio data that the second external electronic device has transmitted to the first external electronic device through the first wireless communication link, by using configuration information corresponding to the first wireless communication link, and output an audio signal corresponding to the at least partial audio data.

2. The electronic device of claim 1, wherein the processor is further configured to receive the configuration information from the first external electronic device through the wired communication link.

3. The electronic device of claim 1, wherein the processor is further configured to:

in response to the wired communication link being disconnected, establish a second wireless communication link with the first external electronic device by using the wireless communication circuitry; and receive the configuration information through the second wireless communication link.

4. The electronic device of claim 1, wherein the processor is further configured to transmit data about reception or non-reception of the at least partial audio data, to the first external electronic device.

5. The electronic device of claim 1, wherein the processor is further configured to charge a battery of the electronic device through the interface circuitry, based at least on that the wired communication link is connected.

6. The electronic device of claim 1, wherein the configuration information comprises information for accessing, by the electronic device, the first wireless communication link by using the wireless communication circuitry.

7. The electronic device of claim 1, wherein the processor is further configured to receive data about information that is used to process the audio data, from the first external electronic device.

8. The electronic device of claim 7, wherein the information being used to process the audio data comprises at least one information among information on a channel of the audio data, information on an output intensity of the audio data, information on a sound effect applied to the audio data, or information on a filter applied to the audio data.

9. The electronic device of claim 1, wherein the configuration information further comprises, in response to the wired communication link being disconnected, information for forming a second wireless communication link with the first external electronic device by using the wireless communication circuitry.

10. A method of an electronic device, the method comprising:

in response to being coupled with a first external electronic device by a wired communication link, receiving, from the first external electronic device through an interface circuitry of the electronic device, at least partial audio data among audio data that a second external electronic device has transmitted to the first external electronic device through a first wireless communication link with the first external electronic device;

in response to the wired communication link with the first external electronic device being disconnected, receiving, from the second external electronic device through a wireless communication circuitry of the electronic device, at least partial audio data among the audio data that the second external electronic device has transmitted to the first external electronic device through the first wireless communication link, by using configuration information corresponding to the first wireless communication link; and outputting an audio signal corresponding to the at least partial audio data.

11. The method of claim 10, further comprising receiving the configuration information from the first external electronic device through the wired communication link.

12. The method of claim 10, further comprising:

in response to the wired communication link being disconnected, establishing a second wireless communication link with the first external electronic device; and receiving the configuration information through the second wireless communication link.

13. The method of claim 10, further comprising transmitting data about reception or non-reception of the at least partial audio data, to the first external electronic device.

14. The method of claim 10, wherein the configuration information comprises information for accessing, by the electronic device, the first wireless communication link by using the wireless communication circuitry.

15. The method of claim 10, further comprising receiving data about information that is used to process the audio data, from the first external electronic device.

16. The method of claim 15, wherein the information being used to process the audio data comprises at least one information among information on a channel of the audio data, information on an output intensity of the audio data, information on a sound effect applied to the audio data, or information on a filter applied to the audio data.

17. The method of claim 10, wherein the configuration information further comprises, in response to the wired communication link being disconnected, information for forming a second wireless communication link with the first external electronic device by using the wireless communication circuitry.

18. An electronic device comprising:

an interface circuitry configured to be coupled with a first external electronic device through a wired communication link;

a wireless communication circuitry; and a processor configured to:

in response to being coupled with the first external electronic device through the interface circuitry by the wired communication link, transmit, to the first external electronic device through the interface circuitry, at least partial audio data among audio data that is received from a second external electronic device through a first wireless communication link, transmit configuration information related with the first wireless communication link to the first external electronic device, wherein, in response to the wired communication link being disconnected, the first external electronic device acquires the at least partial audio data from the second external electronic device by using the configuration information, and output an audio signal corresponding to another at least partial audio data among the received audio data.

19. The electronic device of claim 18, wherein the processor is further configured to transmit the configuration information to the first external electronic device through the wired communication link.

20. The electronic device of claim 18, wherein the processor is further configured to:
in response to the wired communication link being disconnected, establish a second wireless communication link with the first external electronic device by using the wireless communication circuitry; and
transmit the configuration information to the first external electronic device through the second wireless communication link.

\* \* \* \* \*